US010680738B2

(12) United States Patent
Inoue

(10) Patent No.: US 10,680,738 B2
(45) Date of Patent: Jun. 9, 2020

(54) TRANSPORT APPARATUS, TRANSPORT SYSTEM, TRANSPORT METHOD, AND STORAGE MEDIUM ON WHICH PROGRAM HAS BEEN STORED

(71) Applicant: NEC CORPORATION, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/915,624

(22) PCT Filed: Sep. 11, 2014

(86) PCT No.: PCT/JP2014/004683
§ 371 (c)(1),
(2) Date: Feb. 29, 2016

(87) PCT Pub. No.: WO2015/045311
PCT Pub. Date: Apr. 2, 2015

(65) Prior Publication Data
US 2016/0197696 A1 Jul. 7, 2016

(30) Foreign Application Priority Data

Sep. 24, 2013 (JP) .................................. 2013-196483

(51) Int. Cl.
*H04J 14/02* (2006.01)
*H04B 10/079* (2013.01)

(52) U.S. Cl.
CPC ...... *H04J 14/0221* (2013.01); *H04J 14/0201* (2013.01); *H04J 14/0205* (2013.01);
(Continued)

(58) Field of Classification Search
None
See application file for complete search history.

(56) References Cited

U.S. PATENT DOCUMENTS 5,790,289 A * 8/1998 Taga ................... H04J 14/0221
398/26
6,031,647 A * 2/2000 Roberts ............... H04B 10/503
398/197
(Continued)

FOREIGN PATENT DOCUMENTS

CN 102342043 A 2/2012
EP 0 926 854 A2 6/1999
(Continued)

OTHER PUBLICATIONS

Jaiswal et al., To Study the Effect of BER and Q-factor in Intersatellite Optical Wireless Communication System, Oct. 2012, IOSRJ Journal of Electronics and Communication Engineering, pp. 19-21.*
(Continued)

*Primary Examiner* — Jai M Lee
(74) *Attorney, Agent, or Firm* — McGinn IP Law Group, PLLC

(57) ABSTRACT

When a plurality of transport apparatuses perform their respective signal compensations using dummy lights, such compensations performed by the plurality of transport apparatuses affect each other in multiplex, with the result that such compensations produce no expected effects. A transport apparatus of the invention is characterized in that the transport apparatus comprises: a transmission unit that transmits a first signal; a generation unit that generates a dummy signal for compensating the first signal transmitted by the transmission unit; and a combination unit that combines the first signal with the dummy signal; wherein the generation unit adjusts the intensity of the dummy signal, which is to be generated, such that a second signal obtained by combining the first signal with the dummy signal will have a constant intensity.

11 Claims, 17 Drawing Sheets

(52) U.S. Cl.
CPC ...... *H04J 14/0267* (2013.01); *H04J 14/0287* (2013.01); *H04B 10/07955* (2013.01)

(56) References Cited

U.S. PATENT DOCUMENTS

| | | | | |
|---|---|---|---|---|
| 6,040,933 | A * | 3/2000 | Khaleghi | H04J 14/0221 398/1 |
| 6,115,157 | A * | 9/2000 | Barnard | H04J 14/0221 398/1 |
| 6,404,523 | B1 * | 6/2002 | Morikawa | H04B 10/0775 398/40 |
| 6,449,074 | B1 * | 9/2002 | Okano | H04B 10/077 398/91 |
| 6,760,532 | B1 * | 7/2004 | Livas | H04B 10/077 359/337.11 |
| 8,798,473 | B2 * | 8/2014 | Inoue | H04B 10/27 398/94 |
| 2002/0015199 | A1 * | 2/2002 | Eder | H04B 10/0775 398/36 |
| 2002/0015202 | A1 * | 2/2002 | Michishita | H04J 14/02 398/79 |
| 2002/0067524 | A1 * | 6/2002 | Shinoda | H04B 10/2507 398/38 |
| 2002/0080471 | A1 * | 6/2002 | Akiyama | H04B 10/296 359/337 |
| 2003/0048508 | A1 * | 3/2003 | Yu | H04B 10/506 398/91 |
| 2005/0024715 | A1 * | 2/2005 | Inoue | H04J 14/0221 359/337 |
| 2005/0152693 | A1 | 7/2005 | Grand et al. | |
| 2005/0207754 | A1 * | 9/2005 | Yamaguchi | H04B 10/077 398/38 |
| 2005/0213980 | A1 * | 9/2005 | Ota | H04B 10/2918 398/84 |
| 2005/0213988 | A1 * | 9/2005 | Noguchi | H04B 10/43 398/156 |
| 2006/0018658 | A1 * | 1/2006 | Mori | H04J 14/0221 398/79 |
| 2006/0263089 | A1 * | 11/2006 | Furst | H04B 10/296 398/79 |
| 2007/0003280 | A1 * | 1/2007 | Sada | H04B 10/077 398/27 |
| 2007/0003281 | A1 * | 1/2007 | Mitchell | H04B 10/25073 398/38 |
| 2008/0304829 | A1 * | 12/2008 | Sato | H04J 14/0221 398/79 |
| 2008/0310858 | A1 * | 12/2008 | Lu | H04B 10/296 398/158 |
| 2011/0311216 | A1 * | 12/2011 | Inoue | H04B 10/0791 398/1 |
| 2012/0121257 | A1 * | 5/2012 | Tanaka | H04B 10/07953 398/34 |
| 2012/0243879 | A1 * | 9/2012 | Nashimoto | H04B 10/0799 398/140 |
| 2013/0058647 | A1 * | 3/2013 | Boertjes | H04B 10/0775 398/38 |
| 2013/0251365 | A1 * | 9/2013 | Sone | H04B 10/07955 398/38 |
| 2013/0259479 | A1 * | 10/2013 | Mizuguchi | H04B 10/2507 398/65 |
| 2014/0286635 | A1 * | 9/2014 | Kaneko | H04B 10/0799 398/34 |
| 2015/0330835 | A1 * | 11/2015 | Yamauchi | G01J 1/44 250/214 C |
| 2016/0277098 | A1 * | 9/2016 | Decker | H04B 10/03 |

FOREIGN PATENT DOCUMENTS

| | | |
|---|---|---|
| EP | 0926 854 A2 | 6/1999 |
| EP | 0 910 182 B1 | 5/2006 |
| JP | H09-261205 A | 10/1997 |
| JP | H 10-150433 A | 6/1998 |
| JP | 2000-232417 A | 8/2000 |
| JP | 2002-353939 A | 12/2002 |
| JP | 2005-051596 A | 2/2005 |
| JP | 2005-269007 A | 9/2005 |
| JP | 2008-306677 A | 12/2008 |
| JP | 2010-226167 A | 10/2010 |

OTHER PUBLICATIONS

Jaiswal et al. To Study the Effect of BER and Q-factor in Intersatellite Optical Wireless Communication System, 2012 (Year: 2012).*
International Search Report (ISR) (PCT Form PCT/ISA/210), in PCT/JP2014/004683, dated Oct. 14, 2014.
Form PCT/ISA/237 (English version).
Extended European Search Report in European Application No. 14849592.2 dated May 10, 2017.
Japanese Office Action dated May 9, 2017 with an English translation thereof.
Chinese Office Action dated Jun. 1, 2017 with an English translation thereof.
Japanese Decision to Grant a Patent dated Jul. 17, 2018 in corresponding Japanese Application No. 2015-538878, with an English translation thereof.

* cited by examiner

Fig. 12

| CASE | LOW(1) | LOW(2) | STATION TARGETED FOR AUTOMATIC PRE-EMPHASIS CONTROL |
|---|---|---|---|
| i | — | — | NONE |
| ii | — | APPLICABLE | TRUNK STATION 1 (STATION B) FOR STATION C |
| iii | APPLICABLE | — | BRANCH STATION 2 (STATION C) FOR STATION B |
| iv | APPLICABLE | APPLICABLE | NONE |

Fig. 13

| CASE | LOW(1) | LOW(2) | STATION TARGETED FOR AUTOMATIC PRE-EMPHASIS CONTROL |
|---|---|---|---|
| i | — | — | NONE |
| ii | — | APPLICABLE | TRUNK STATION 1 (STATION A) FOR STATION C |
| iii | APPLICABLE | — | BRANCH STATION 2 (STATION C) FOR STATION B |
| iv | APPLICABLE | APPLICABLE | NONE |

Fig. 14

| CASE | LOW(1) | LOW(2) | STATION TARGETED FOR AUTOMATIC PRE-EMPHASIS CONTROL |
|---|---|---|---|
| i | — | — | NONE |
| ii | — | APPLICABLE | BRANCH STATION 2 (STATION C) FOR STATION A |
| iii | APPLICABLE | — | BRANCH STATION 2 (STATION C) FOR STATION B |
| iv | APPLICABLE | APPLICABLE | TRUNK STATION 1 (STATION A) FOR STATION B<br>TRUNK STATION 1 (STATION B) FOR STATION A |

TRANSPORT APPARATUS, TRANSPORT SYSTEM, TRANSPORT METHOD, AND STORAGE MEDIUM ON WHICH PROGRAM HAS BEEN STORED

TECHNICAL FIELD

The present invention relates to a transport apparatus, a transport system, a transport method, and a storage medium on which a program has been stored.

BACKGROUND ART

A submarine cable system having the OADM (Optical Add/Drop Multiplex) function of freely inserting or removing signals for each light wavelength includes a plurality of paths, which are accommodated in one optical fiber to improve the flexibility of a communication network and thereby relieve the burden of plant and equipment investment.

In the submarine cable system having the OADM function, the total power of a signal transmitted through cables made of optical fibers is set constant. More specifically, in the submarine cable system having the OADM function, when some wavelength components of a signal are lost upon, for example, cable disconnection, the remaining wavelength components of the signal are amplified to maintain the total power of the signal constant.

However, when the powers of specific wavelength components of the signal reach a predetermined value or more upon amplification of only these powers, the optical spectrum changes due to factors such as deterioration of the waveform of the signal related to the nonlinear effects of the optical fibers, thus degrading the transport quality of the signal.

Thus, the submarine cable system has the OADM Fault Recovery function of, when trouble occurs in any cable, compensating the intensity (power) level of a signal group remaining without a loss, using dummy light to ensure a given communication quality.

PTL 1 discloses a technique for compensating the intensity (power) level of a signal (group) in an optical communication system. To compensate for the difference in power level between a signal (group) from a transmitting station and a signal (group) from a branch station, the optical communication system multiplexes the signal (group) transmitted from the branch station with a dummy signal to compensate the signal (group) from the branch station using dummy light. The compensation allows the signal (group) from the transmitting station and the signal (group) from the branch station to keep nearly the same power level to prevent degradation of the system operating characteristics.

However, in the optical communication system described in PTL 1, since the entire signal (group) from the branch station is multiplexed with dummy light, the power level of the entire signal (group) can be compensated but the power levels of, for example, some components of the signal (group) cannot be compensated.

In contrast, to overcome this situation, PTL 2 discloses a technique for providing dummy light generation/adjusting units in terminal apparatuses (transmitting stations) to compensate the power level of the signal for each terminal apparatus (transmitting station). PTL 2 describes providing each terminal apparatus (transmitting station) with a dummy light generation/adjusting unit which generates dummy light corresponding to a portion suffering optical signal disconnection upon the occurrence of cable disconnection trouble to maintain the channel power of the signal constant.

In the submarine cable system, since a plurality of paths for connecting different locations to each other can be accommodated in only one optical fiber, signals from a plurality of terminal apparatuses (transmitting stations) can be multiplexed and transmitted to an opposed terminal apparatus (receiving station). Therefore, the power levels of some components of a signal (group) obtained by multiplexing signals from a plurality of terminal apparatuses can be compensated by compensating the power level of the signal using dummy light for each terminal apparatus, as in PTL 2.

CITATION LIST

Patent Literature

PTL 1: Japanese Unexamined Patent Application Publication No. H10-150433
PTL 2: Japanese Unexamined Patent Application Publication No. 2010-226167

SUMMARY OF INVENTION

Technical Problem

As described above, according to PTL 2, each of a plurality of terminal apparatuses (transmitting stations) compensates the power level of a signal using dummy light. However, when each of a plurality of terminal apparatuses (transmitting stations) compensates a signal using dummy light, such compensation actions by the plurality of terminal apparatuses (transmitting stations) affect each other in multiplexing and may produce no expected effects.

In order to solve the above-mentioned problem, it is an object of the present invention to provide a transport apparatus, a transport system, a transport method, and a storage medium on which a program has been stored, which can ensure a given effectiveness of compensation even if each of a plurality of transport apparatuses (terminal apparatuses) compensates a signal using dummy light.

Solution to Problem

A transport apparatus according to the present invention comprises transmission means for transmitting a first signal, generation means for generating a dummy signal for compensating the first signal transmitted from the transmission means and combination means for combining the first signal with the dummy signal, wherein the generation means adjusts an intensity of the dummy signal to be generated, to maintain an intensity of a second signal obtained by combining the first signal with the dummy signal constant.

A transport system according to the present invention comprises a plurality of transport apparatuses each comprising transmission means for transmitting a first signal, generation means for generating a dummy signal for compensating the first signal transmitted from the transmission means and combination means for combining the first signal with the dummy signal, wherein the generation means adjusts an intensity of the dummy signal to be generated, to maintain an intensity of a second signal obtained by combining the first signal with the dummy signal constant.

A transport method according to the present invention comprises transmitting a first signal, generating a dummy signal for compensating the first signal, combining the first signal with the dummy signal and adjusting an intensity of the dummy signal to be generated, to maintain an intensity of a second signal obtained by combining the first signal with the dummy signal constant.

A program which has been stored on a storage medium according to the present invention causes a computer to execute the processes of transmitting a first signal, generating a dummy signal for compensating the first signal, combining the first signal with the dummy signal and adjusting an intensity of the dummy signal to be generated, to maintain an intensity of a second signal obtained by combining the first signal with the dummy signal constant.

Advantageous Effects of Invention

The present invention can ensure a given effectiveness of compensation even if each of a plurality of transport apparatuses (terminal apparatuses) compensates a signal using dummy light.

BRIEF DESCRIPTION OF DRAWINGS

FIG. 12 is a table representing the correspondence between a combination of LOW alarms received by a trunk station and a landing station that requires automatic pre-emphasis control according to the third exemplary embodiment of the present invention.

FIG. 13 is a table representing the correspondence between a combination of LOW alarms received by another trunk station and a landing station that requires automatic pre-emphasis control according to the third exemplary embodiment of the present invention.

FIG. 14 is a table representing the correspondence between a combination of LOW alarms received by a branch station and a landing station that requires automatic pre-emphasis control according to the third exemplary embodiment of the present invention.

DESCRIPTION OF EMBODIMENTS

First Exemplary Embodiment

Figure 1:
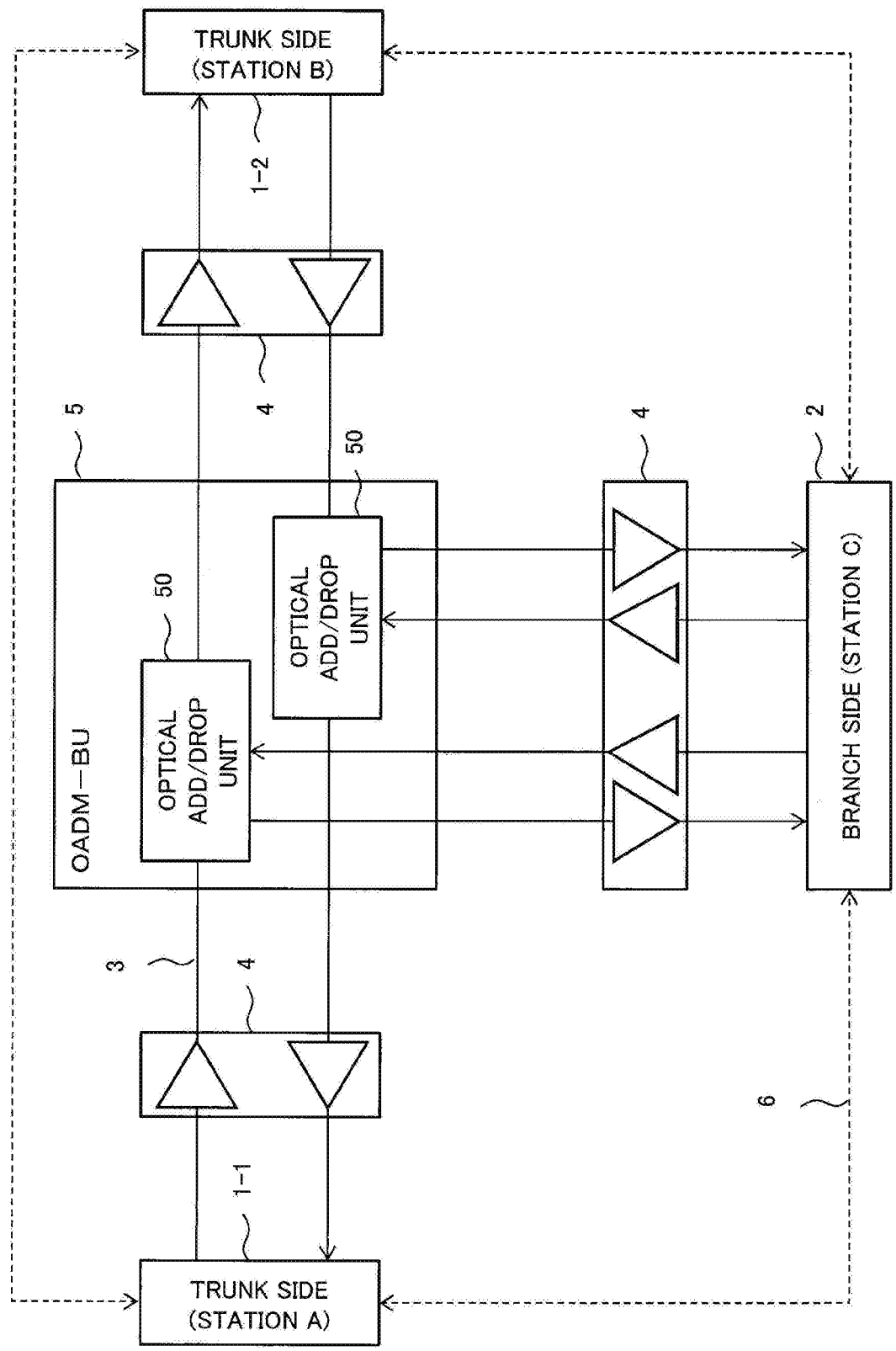
FIG. 1 is a block diagram illustrating an exemplary configuration of a transport system according to a first exemplary embodiment of the present invention.

A first exemplary embodiment of the present invention will be described below with reference to the accompanying drawings. It should be noted that reference numerals are assigned to respective components in this overview as an example to foster a better understanding, and details of this overview are not intended to impose any limitations.

It should be noted that although the first exemplary embodiment of the present invention will be described hereinafter by taking optical signals as an example, the present invention is not limited to optical signals and is also applicable to, for example, electrical signals.

According to the first exemplary embodiment of the present invention, the signal receiving side notifies the signal transmitting side of the quality of a received signal (reception quality), and this transmitting side adjusts the intensity (power) of a signal to be transmitted, based on the notified reception quality. Thus, with this operation, in the first exemplary embodiment of the present invention, the transmitting side can adjust the intensity (power) of a signal to be transmitted, based on the reception quality on the receiving side. When, for example, it can be detected that trouble has occurred in the transport channel based on the notified reception quality, this means that the intensities of predetermined wavelength components are amplified by a repeating device in the transport channel. Therefore, amplification of the intensities (powers) of the specific wavelength components can be suppressed by lowering in advance the intensity (power) of a signal to be transmitted and then transmitting the signal.

It should be noted that in the first exemplary embodiment of the present invention, controlling (adjusting) a signal to be transmitted from the signal transmitting side based on the reception quality of the signal on the receiving side, as described above, will be referred to as automatic pre-emphasis control hereinafter.

Here, the transport system for optical signals includes a plurality of transport apparatuses (transmitting stations). This system combines signals from the plurality of transport apparatuses (transmitting stations) and transports the combined signal via transport channels. In this case, when the intensity (power) of a signal to be transmitted from one transport apparatus (transmitting station) changes, this may affect signals to be transmitted from other transport apparatuses (transmitting stations). When, for example, a signal to be transmitted from one transport apparatus has its intensity (power) lowered by automatic pre-emphasis control in advance and is then transmitted, the intensities (powers) of signals to be transmitted from other transport apparatuses may become high.

Accordingly, a transport apparatus according to the first exemplary embodiment of the present invention uses dummy light to compensate for a change in intensity (power) of a signal to be transmitted from a given transport apparatus (transmitting station) to suppress the change in intensity (power) of the signal to be transmitted from the given transport apparatus (maintain the power of the signal constant). This hereby reduces the influence exerted on signals to be transmitted from other transport apparatuses even if the signal to be transmitted from the given transport apparatus changes upon automatic pre-emphasis control.

According to the first exemplary embodiment of the present invention, an example of compensation for a change in signal intensity using dummy light by one transport apparatus (transmitting station) when trouble occurs in a transport channel for transporting a signal and specific wavelength components are lost from the signal will be given below. It should be noted that in the first exemplary embodiment of the present invention, the signal intensity may even be compensated using dummy light when no trouble occurs in the transport channel.

FIG. 1 is a block diagram illustrating an exemplary transport system according to the first exemplary embodiment of the present invention. The transport system according to the first exemplary embodiment of the present invention has the OADM function.

The transport system according to the first exemplary embodiment of the present invention includes two trunk stations 1 (station A 1-1 and station B 1-2) and one branch station 2 (station C), as depicted in FIG. 1. It should be noted that the number of branch stations 2 included in the transport system is not limited to one and may be greater than one.

Further, the transport system includes, for example, transport channels 3 made of optical fibers. Furthermore, the transport system includes an optical repeater 4 which compensates for signal attenuation in the transport channels 3. Further, the transport system includes a branching device 5 which inserts or branches a signal. Furthermore, the transport system moreover includes communication channels 6 for connecting the trunk stations 1 and the branch station 2 to each other.

The trunk stations 1 and the branch station 2 serve as, for example, landing stations in a submarine cable system. Each of the trunk stations 1 and the branch station 2 includes transport apparatuses (not illustrated in FIG. 1). Each transport apparatus includes, for example, a means for transmitting or receiving a signal and a monitor means for the signal.

Further, each of the trunk stations 1 and the branch station 2 exchanges, for example, information required to transmit or receive signals via communication channels 6 (outbound communication channels) provided by lines different from the transport channels 3. It should be noted that each of the trunk stations 1 and the branch station 2 may exchange the information via inbound communication channels provided in the transport channels 3 using an overhead incurred at the trunk stations 1 and the branch station 2. Further, each of the trunk stations 1 and the branch station 2 may exchange the information via redundant communication channels using both outbound and inbound communication channels.

The transport channels 3 are made of optical fibers and may be formed by bundling a plurality of optical fibers together. The trunk stations 1 and the branch station 2 transmit or receive signals to or from each other via the transport channels 3.

The optical repeater 4 functions as a means for, for example, compensating for signal attenuation in the transport channels 3.

The branching device 5 functions as a means for, for example, inserting or branching (adding/dropping) a signal. The branching device 5 is implemented in, for example, an OADM-BU (OADM-BU: OADM-Branching Unit). The OADM-BU inserts or branches a signal for each wavelength and can insert or branch, for example, only a desired wavelength for the signal. The OADM-BU includes, for example, an Add/Drop unit 50 which inserts or branches a signal and the Add/Drop unit 50 inserts or branches a signal.

The branching device 5, for example, branches a signal from the trunk station 1 and multiplexes a signal from the branch station 2. The transport system according to the first exemplary embodiment of the present invention uses the branching device 5 to replace a desired signal (or signal group) of signals (signal groups) transmitted from the trunk station 1 (for example, station A) with a signal (or signal group) transmitted from the branch station 2 (station C) and transmits the resultant signal to the opposed trunk station 1 (for example, station B).

Figure 2:
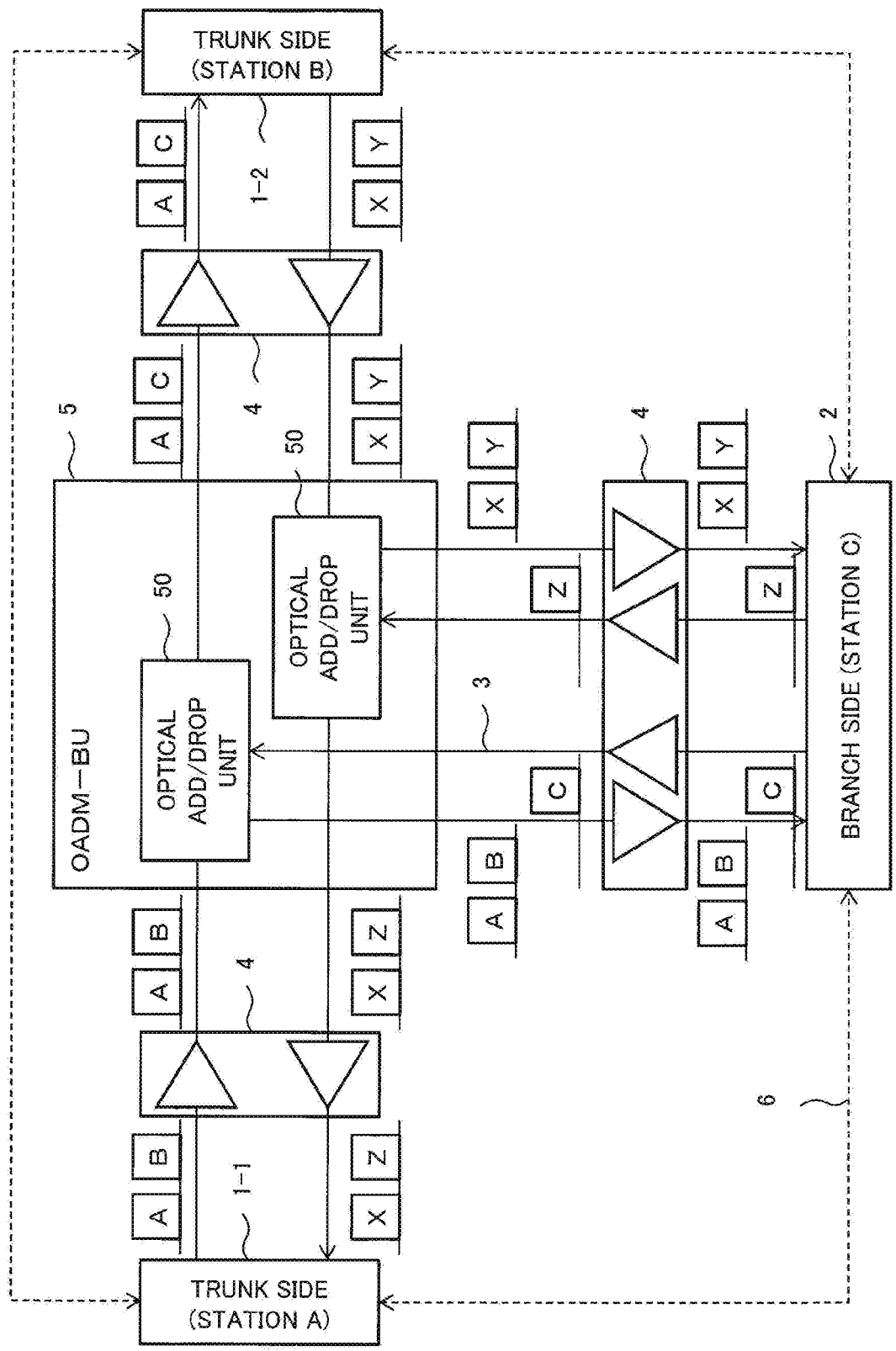
FIG. 2 is a block diagram illustrating an example of signal insertion or branching in a branching device according to the first exemplary embodiment of the present invention.

FIG. 2 is a block diagram illustrating an example of signal insertion or branching in the branching device 5. A signal transmitted from the trunk station 1-1 (station A) contains a trunk signal block A and a Drop signal block B, as depicted in FIG. 2. The branching device 5 transmits the trunk signal block A (that is, does not transmit the Drop signal block B) of a signal transmitted from the trunk station 1-1 (station A) and multiplexes the resultant signal with an Add signal block C transmitted from the branch station 2 (station C). Then, the branching device 5 transmits a signal containing the trunk signal block A and the Add signal block C to the trunk station 1-2 (station B).

Further, the branching device 5, for example, further transmits a trunk signal block X of a signal transmitted from the trunk station 1-2 (station B) and multiplexes the resultant signal with an Add signal block Z transmitted from the branch station 2 (station C), as depicted in FIG. 2. Then, the branching device 5 transmits a signal containing the trunk signal block X and the Add signal block Z to the trunk station 1-1 (station A).

Figure 3:
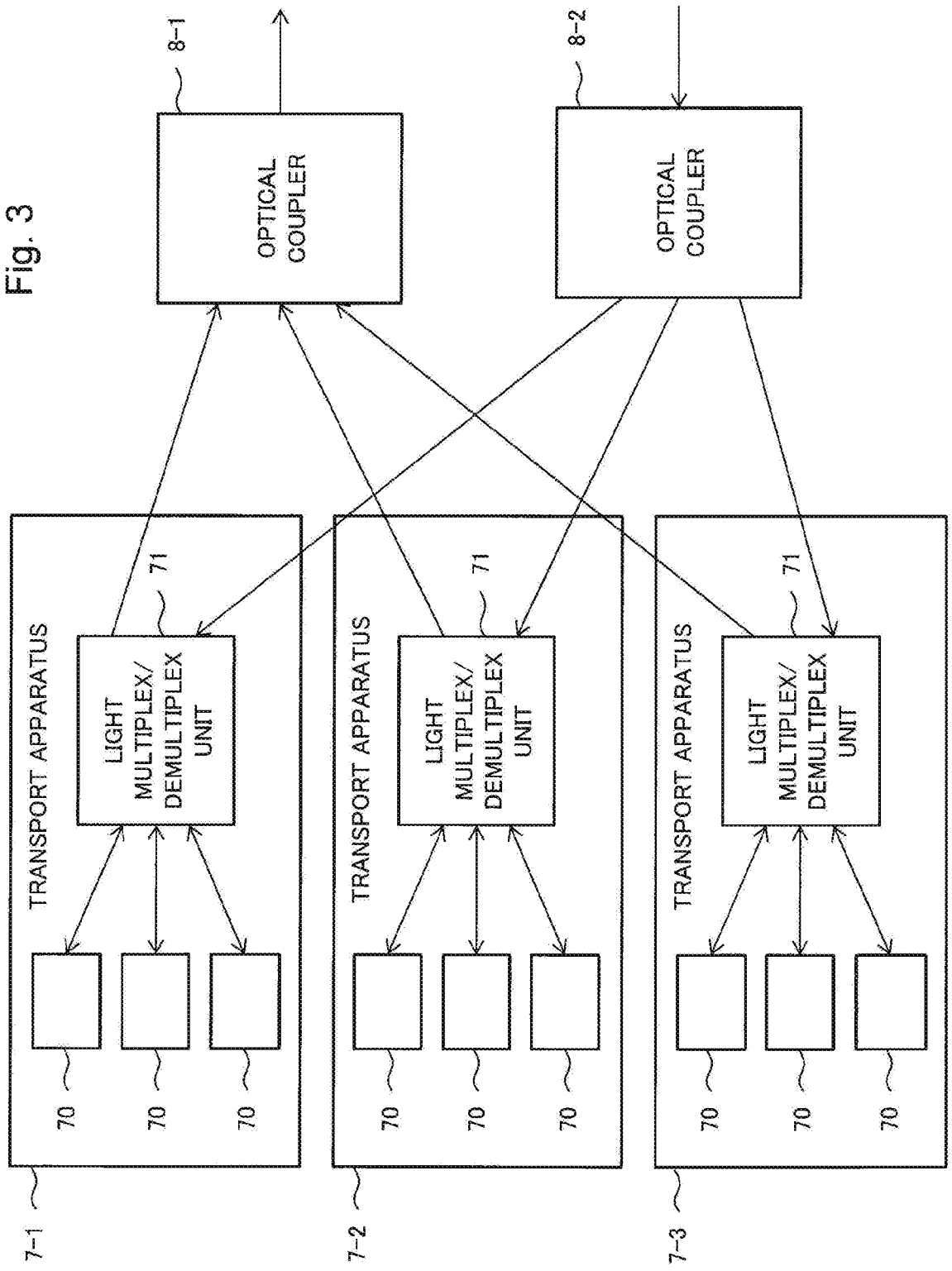
FIG. 3 is a block diagram illustrating an exemplary configuration of a trunk station or a branch station according to the first exemplary embodiment of the present invention.

FIG. 3 is a block diagram illustrating an exemplary configuration of the trunk station 1 or the branch station 2 according to the first exemplary embodiment of the present invention. In the first exemplary embodiment of the present invention, the trunk station 1 or the branch station 2 includes a plurality of transport apparatuses 7 and a plurality of optical couplers 8, as depicted in FIG. 3.

The transport apparatus 7 functions as, for example, a means for transmitting or receiving a signal and a monitor means for the signal. It should be noted that the plurality of transport apparatuses 7 (transport apparatuses 7-1, 7-2, & 7-3) may be respectively managed by, for example, different carriers. When the plurality of transport apparatuses 7 are managed by different carriers, each of the trunk signal block, the Add signal block, and the Drop signal block is a mixture of signals from the different carriers. Again, when the plurality of transport apparatuses 7 are managed by different carriers, a signal transmitted through the transport channel 3 is a mixture of signals generated by different carriers for each wavelength set.

Each transport apparatus 7 includes a plurality of light transmission/reception units 70 and a light multiplex/demultiplex unit 71, as illustrated in FIG. 3.

The plurality of light transmission/reception units 70 respectively transmit or receive signals having different wavelengths. The light multiplex/demultiplex unit 71 multiplexes signals having different wavelengths and received from the plurality of light transmission/reception units 70 into a multiple-wavelength signal. Further, the light multiplex/demultiplex unit 71 demultiplexes an externally received signal and transmits the resultant signal to each of the plurality of light transmission/reception units.

An optical coupler 8-1 multiplexes signals respectively received from the plurality of transport apparatuses 7. Further, an optical coupler 8-2 branches an externally received signal and respectively transmits the resultant signals to the plurality of transport apparatuses 7.

Figure 4:
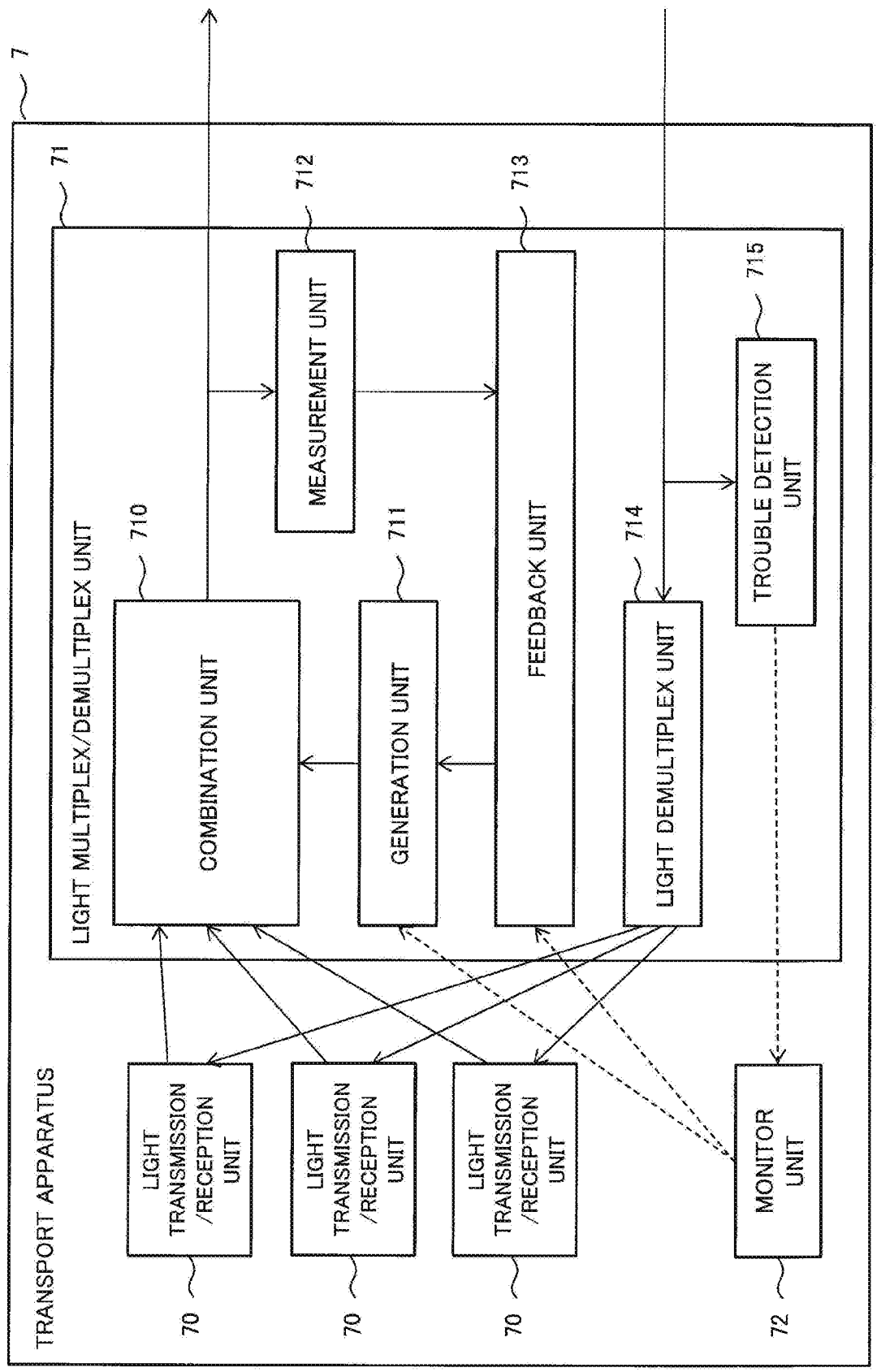
FIG. 4 is a block diagram illustrating an exemplary configuration of a transport apparatus according to the first exemplary embodiment of the present invention.

FIG. 4 is a block diagram illustrating an exemplary configuration of the transport apparatus 7 according to the first exemplary embodiment of the present invention. In the first exemplary embodiment of the present invention, the transport apparatus 7 includes a plurality of light transmission/reception units 70, a light multiplex/demultiplex unit 71, and a monitor unit 72, as depicted in FIG. 4.

The light multiplex/demultiplex unit 71 includes a light demultiplex unit 714 and a trouble detection unit 715, as illustrated in FIG. 4. The light demultiplex unit 714 demultiplexes an externally received signal group and respectively transmits the demultiplexed signals to the light transmission/reception units 70. The trouble detection unit 715 monitors the optical spectrum of an externally received signal group to detect the loss of some signals (or a signal subgroup) which constitute the signal group. The trouble detection unit 715 notifies the monitor unit 72 of a loss of signal when it detects that the loss of signal has occurred.

Figure 5:
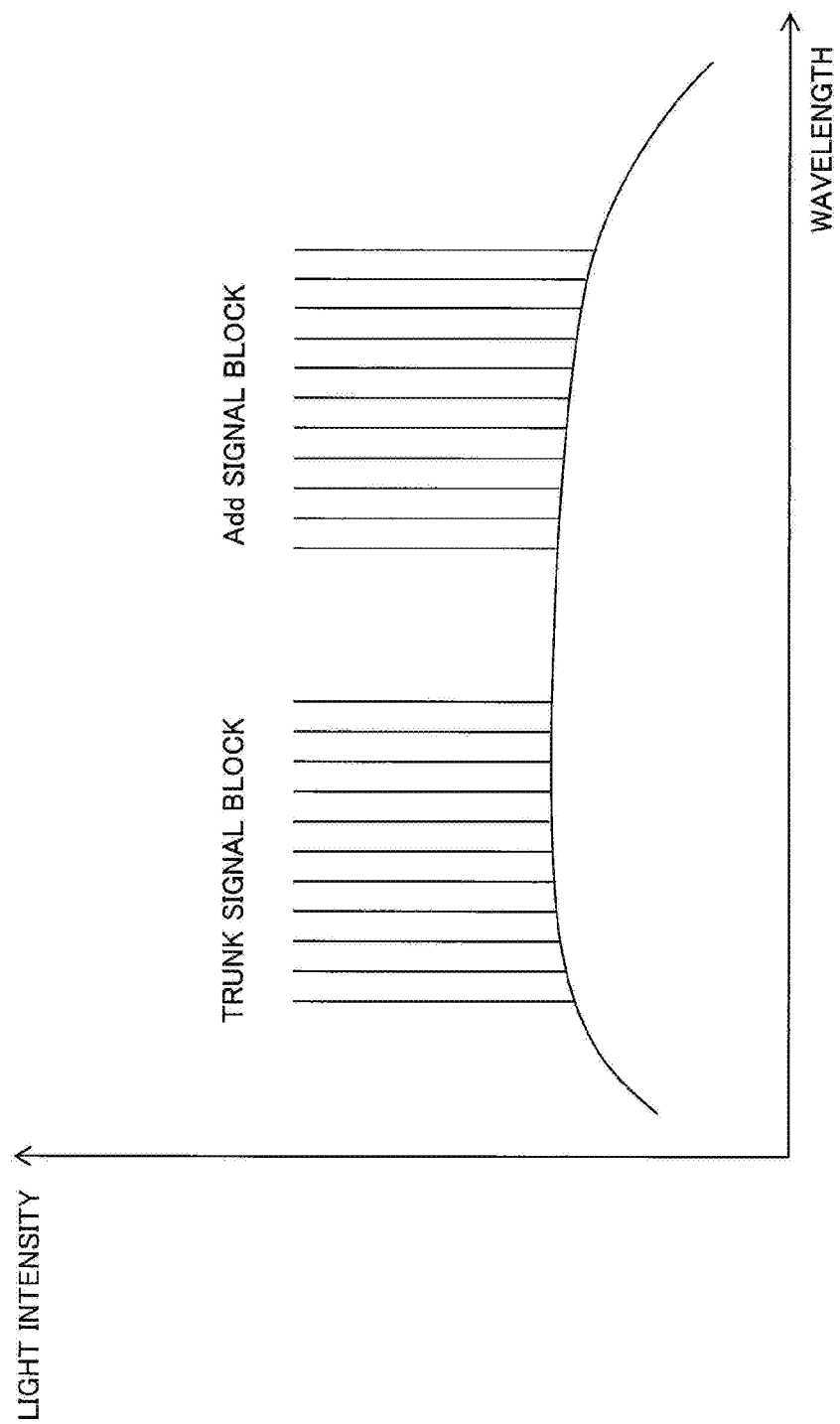
FIG. 5 is a view illustrating an exemplary optical spectrum of a signal according to the first exemplary embodiment of the present invention.

FIG. 5 is a view illustrating an exemplary optical spectrum of a signal when no loss of signal occurs. FIG. 5 shows the signal intensity (power) on the ordinate and the signal wavelength on the abscissa. The trunk station 1-2 (station B) receives a signal obtained by multiplexing a trunk signal block from the trunk station 1-1 (station A) and an Add signal block from the branch station 2 (station C) when, for example, no loss of signal occurs.

Figure 6:
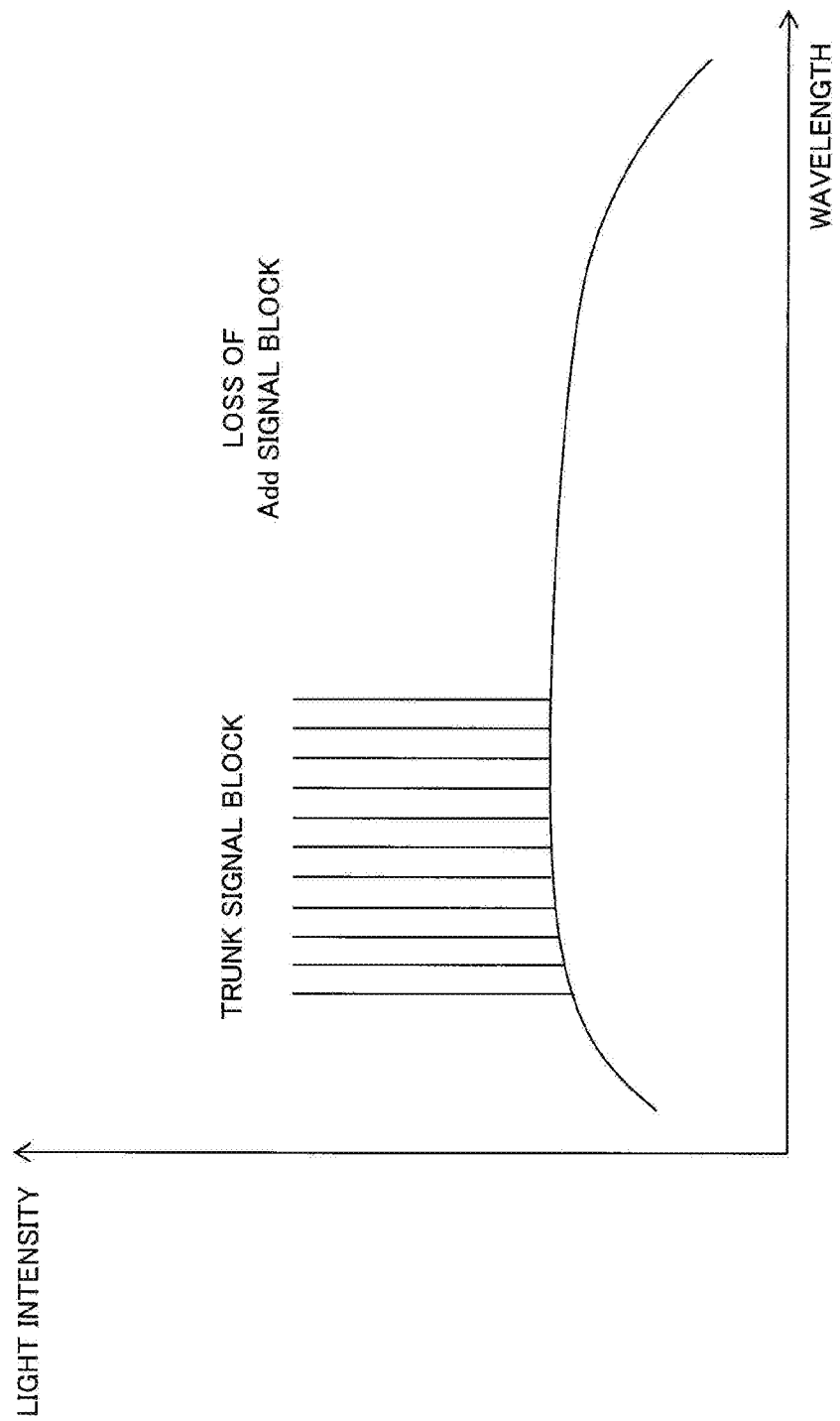
FIG. 6 is a view illustrating another exemplary optical spectrum of a signal according to the first exemplary embodiment of the present invention.

Here, FIG. 6 is a view illustrating an exemplary optical spectrum of a signal when a loss of signal occurs. FIG. 6 shows the signal intensity (power) on the ordinate and the signal wavelength on the abscissa. FIG. 6 illustrates an exemplary signal received by the trunk station 1-2 (station B) when trouble occurs in the transport channel 3 between the OADM-BU and the branch station 2 (station C) and an Add signal block from the branch station 2 (station C) is lost. When, for example, a loss of signal occurs, an Add signal block from the branch station 2 (station C) is lost, so the trunk station 1-2 (station B) receives only a trunk signal block from the trunk station 1-1 (station A).

In this case (in the case of FIG. 6), the trouble detection unit 715 detects that an Add signal block is lost from the received signal (group) and notifies the monitor unit 72 of a loss of signal. The trouble detection unit 715 notifies the monitor unit 72 of an alarm when, for example, an Add signal block is lost. The trouble detection unit 715 uses, for example, LOW (Loss of Wavelength) as an alarm.

Here, an alarm issued when a trunk signal block is lost is defined as LOW(1) and an alarm issued when an Add signal block is lost is defined as LOW(2). In this case, in the example shown in FIG. 6, since an Add signal block is lost, the trouble detection unit 715 of the trunk station 1-2 (station B) notifies the monitor unit 72 of only LOW(2) as an alarm. It is noted that when only one branch station 2 (station C) exists, two types of LOW alarms, namely, LOW(1) and LOW(2) are used. As the number of branch stations 2 increases, the number of types of LOW alarms also increases.

Here, in the example shown in FIG. 6, although an alarm issued when a trunk signal block is lost is defined as LOW(1) and an alarm issued when an Add signal block is lost is defined as LOW(2), the correspondence between the signal block and LOW is not limited to this and is defined for each landing station (that is, each of the trunk stations 1 and the branch station 2).

In addition, although trunk and Add signals are in units of blocks in the example shown in FIG. 6, LOW is defined for each wavelength when trunk and Add signals are in units of wavelengths.

It should be noted that the monitor unit 72 may detect that trouble has occurred in the transport channel 3, using LOS (Loss of Signal) sent from the light transmission/reception unit 70, instead of an alarm sent from the trouble detection unit 715.

In the first exemplary embodiment of the present invention, the monitor unit 72 of the transport apparatus 7 notifies an opposed transport apparatus 7 of information concerning the reception quality of a received signal, in response to a LOW alarm from the trouble detection unit 715. The information concerning the reception quality is stored in, for example, the header portion of a signal to be transmitted to the opposed transport apparatus 7.

It should be noted that in the first exemplary embodiment of the present invention, the monitor unit 72 of the transport apparatus 7 may notify an opposed transport apparatus 7 of the reception quality of a received signal and request this transport apparatus 7 to execute automatic pre-emphasis control, in response to a LOW alarm from the trouble detection unit 715. In other words, according to the first exemplary embodiment of the present invention, the transport apparatus 7 on the receiving side may request the transport apparatus 7 on the transmitting side to execute automatic pre-emphasis control, upon detection of trouble having occurred in the transport channel 3. Since the trouble detection unit 715 can detect that trouble has occurred in the transport channel 3 in the direction from the trunk station 1-2 (station B) to the trunk station 1-1 (station A), the trouble detection unit 715 may request the transmitting side to execute compensation of a signal to be transmitted (automatic pre-emphasis control).

It should be noted that in the first exemplary embodiment of the present invention, when the monitor unit 72 of the transport apparatus 7 can detect that trouble has occurred in the transport channel 3 in the direction to transmit a signal by this apparatus, automatic pre-emphasis control in this apparatus may be executed upon the occurrence of the trouble.

Figure 7:
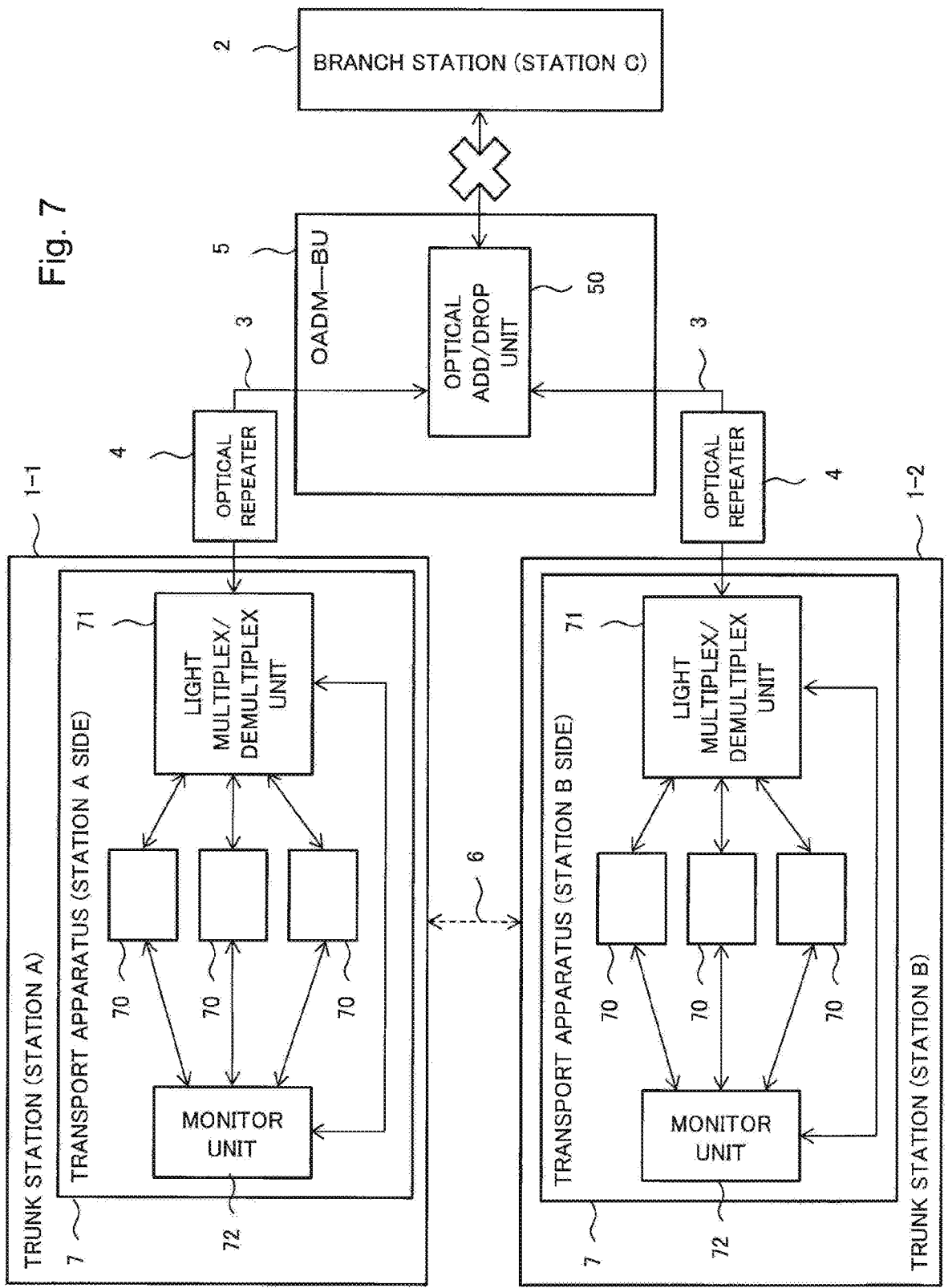
FIG. 7 is a block diagram illustrating another exemplary configuration of the transport system according to the first exemplary embodiment of the present invention.

FIG. 7 is a block diagram illustrating configurations necessary for explaining automatic pre-emphasis control and extracted from the exemplary configuration of the transport system according to the first exemplary embodiment of the present invention. FIG. 7 illustrates an exemplary case where the transmitting side is the trunk station 1-1 (station A) and the receiving side is the trunk station 1-2 (station B). In the example shown in FIG. 7, the trunk station 1-1 (station A) transmits a signal and the trunk station 1-2 (station B) receives the signal. Upon receiving the signal, the trunk station 1-2 (station B) notifies the trunk station 1-1 (station A) of information concerning the reception quality when the signal is received. The trunk station 1-1 (station A) adjusts the intensity (power) of a signal to be transmitted, based on the reception quality notified by the trunk station 1-2 (station B). It should be noted that the trunk station 1-2 (station B) notifies the trunk station 1-1 (station A) of the reception quality of the signal via the communication channels 6 (outbound). The trunk station 1-2 (station B) may notify the trunk station 1-1 (station A) of the reception quality of the signal via the transport channels 3 (inbound).

As depicted in FIG. 7, when trouble occurs in the transport channel 3 between the branch station 2 (station C) and the branching device 5 (OADM-BU), an Add signal block transmitted from the branch station 2 (station C) is lost. Therefore, when, for example, the trunk station 1-1 (station A) transmits a trunk signal block, only the trunk signal block propagates through the transport channels 3. As described above, when the trunk signal block is amplified by the optical repeater 4 for maintaining the total power of the signal constant, the optical spectrum changes due to factors such as deterioration of the waveform of the signal related to the nonlinear effects of the optical fibers, thus degrading the transport quality of the signal.

Thus, in the first exemplary embodiment of the present invention, automatic pre-emphasis control is executed to lower the intensity (power) of a trunk signal block in advance, thereby suppressing amplification of the intensities (powers) of wavelength components of the trunk signal block.

In the first exemplary embodiment of the present invention, the monitor unit 72 of the transport apparatus 7 at the trunk station (station A) monitors each of the plurality of light transmission/reception units 70. The monitor unit 72 requests each of the plurality of light transmission/reception units 70 to send information concerning the reception quality at an opposed trunk station (station B), for a signal transmitted from each of the plurality of light transmission/reception units 70. Examples of the reception quality include the value of the bit error correction count of a signal received by the trunk station (station B), and the value of the signal intensity (power).

It should be noted that the monitor unit 72 may request each of the plurality of light transmission/reception units 70 to send the reception quality information when, for example, the monitor unit 72 is notified by the trouble detection unit 715 that trouble has occurred in the transport channel 3.

The monitor unit 72 receives the value of the reception quality from each of the plurality of light transmission/reception units 70. The monitor unit 72 compares the notified value of the reception quality with a predetermined threshold. When it is determined as a result of comparison that the value of the reception quality is higher than the threshold, the monitor unit 72 requests the light transmission/reception unit 70, having sent the value of the reception quality, to lower the intensity (power) of a signal to be transmitted by a predetermined amount.

More specifically, the monitor unit 72 receives the value of the reception quality of a signal at an opposed trunk station (station B) from each of the plurality of light transmission/reception units 70. The monitor unit 72 compares the notified value of the reception quality with a predetermined threshold. Upon determining that the notified value of the reception quality is higher than the predetermined threshold, the monitor unit 72 requests the light transmission/reception unit 70, having sent a signal with a reception quality higher than the threshold, to lower the intensity (power) of the signal by a predetermined amount. The predetermined amount may be determined in advance or determined by the monitor unit 72 based on the degree of deviation between the value of the reception quality and the threshold.

When the value of the reception quality sent from the receiving side is higher than the threshold, the monitor unit 72 repeatedly requests the light transmission/reception unit 70 to lower the intensity (power) of the signal until the value of the reception quality becomes lower than the threshold. Note that the monitor unit 72 requests each of the plurality of light transmission/reception units 70 to lower the intensity (power) of the signal until the value of the reception quality becomes lower than the threshold.

When a request to transmit the reception quality notification is issued from the monitor unit 72, the light transmission/reception unit 70 receives the reception quality notification from the light transmission/reception unit 70 of the opposed trunk station 1-2 (station B). The light transmission/reception unit 70 of the opposed trunk station 1-2 (station B), for example, incorporates the information concerning the reception quality into one area of the overhead of a transmission frame to be transmitted to the trunk station 1-1 (station A).

The light transmission/reception unit 70 notifies the monitor unit 72 of the reception quality sent from the light transmission/reception unit 70 of the opposed trunk station 1-2 (station B).

When the light transmission/reception unit 70 receives from the monitor unit 72 a request to lower the intensity (power) of a signal to be transmitted, it lowers the intensity (power) of the signal to be transmitted, in response to the request. The light transmission/reception unit 70 lowers the intensity (power) of a signal to be transmitted, based on, for example, an amount requested by the monitor unit 72. It should be noted that the light transmission/reception unit 70 may lower the intensity (power) of a signal to be transmitted, based on, for example, a predetermined amount in place of an amount requested by the monitor unit 72.

Figure 8:
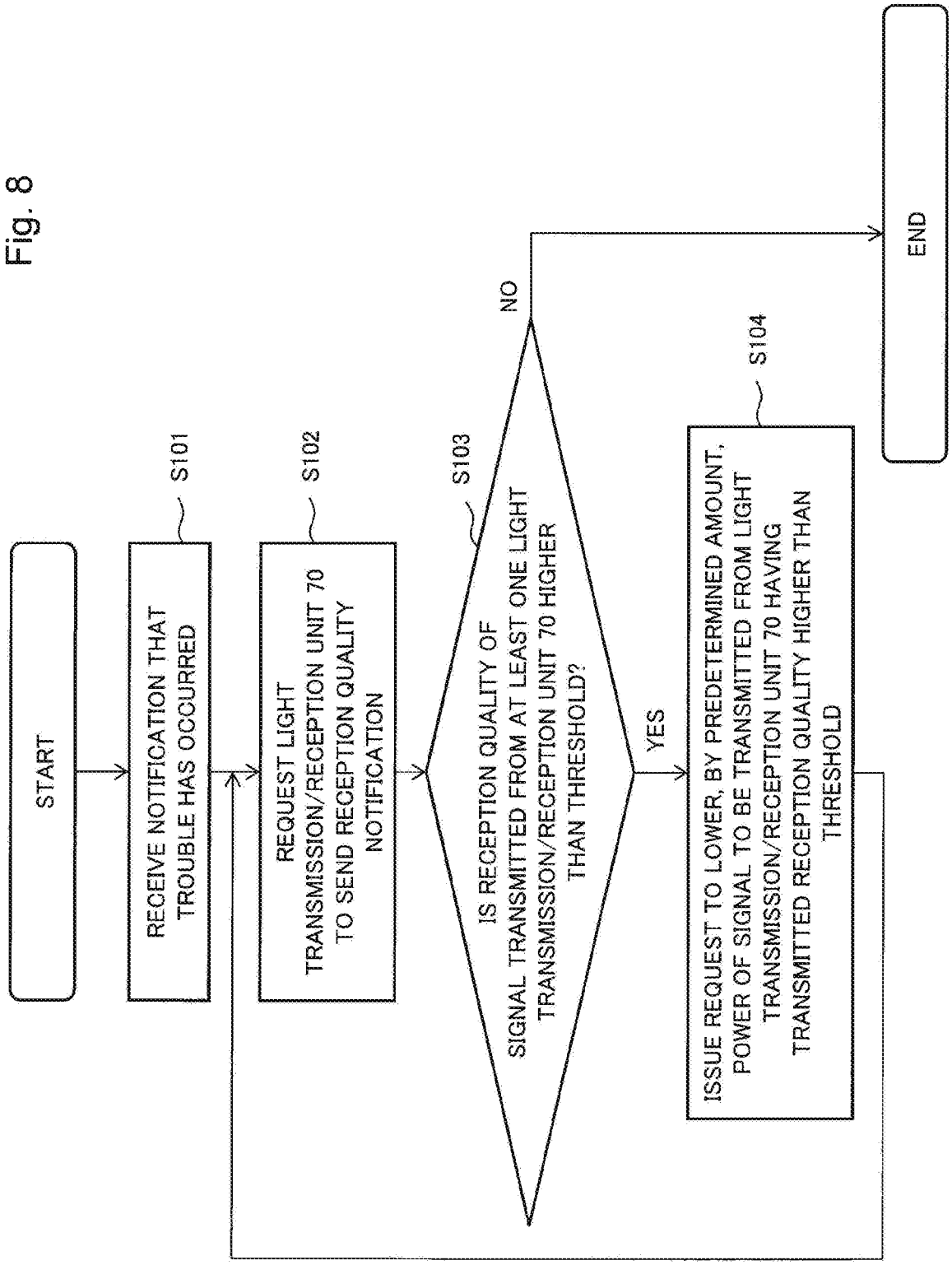
FIG. 8 is a flowchart illustrating an exemplary operation of a monitor unit according to a third exemplary embodiment of the present invention.

FIG. 8 is a flowchart illustrating an exemplary operation of the monitor unit 72 according to the first exemplary embodiment of the present invention.

The monitor unit 72 starts automatic pre-emphasis control upon, for example, receiving a notification that trouble has occurred in the transport channel 3 from the trouble detection unit 715 (S101).

The monitor unit 72 issues, to each of the plurality of light transmission/reception units 70, a request to send the value of the reception quality in the apparatus on the receiving side (that is, the opposed trunk station 1-2 (station B)), for a signal transmitted from the corresponding apparatus (S102). In response to the request, each of the plurality of light transmission/reception units 70 obtains the value of the reception quality from the light transmission/reception unit 70 of the opposed trunk station 1-2 (station B) and notifies the monitor unit 72 of the obtained value of the reception quality.

The monitor unit 72 receives the value of the reception quality in the light transmission/reception unit 70 of the opposed trunk station 1-2 (station B) from each of the plurality of light transmission/reception units 70 and compares the notified value with a predetermined threshold (S103).

If it is determined as a result of comparison that all notified values of the reception qualities are lower than the predetermined threshold, the monitor unit 72 ends automatic pre-emphasis control.

If it is determined as a result of comparison that at least one of the values of the reception qualities is higher than the predetermined threshold, the monitor unit 72 requests the corresponding light transmission/reception unit 70 to lower the power of a signal to be transmitted by a predetermined amount (S104). The monitor unit 72 then returns the process to step 102 (S102), in which it issues a request to send the value of the reception quality. In this case, in step 103 (S103), the monitor unit 72 may request only the corresponding light transmission/reception unit 70 to send the value of the reception quality.

As described above, according to the first exemplary embodiment of the present invention, the signal receiving side notifies the signal transmitting side of the quality of a received signal (reception quality), and the signal transmitting side adjusts the intensity (power) of a signal to be transmitted, based on the notified reception quality. Thus, with this operation, in the first exemplary embodiment of the present invention, the transmitting side can adjust the intensity (power) of a signal to be transmitted, based on the reception quality on the receiving side.

However, as described above, when a signal to be transmitted from one transport apparatus (transmitting station) has its intensity (power) lowered by automatic pre-emphasis control in advance and is then transmitted, the intensities (powers) of signals to be transmitted from other transport apparatuses may become high.

The transport apparatus according to the first exemplary embodiment of the present invention, therefore, uses dummy light to compensate for a change in intensity (power) of a signal to be transmitted from a given transport apparatus (transmitting station) to suppress the change in intensity (power) of the signal to be transmitted from the given transport apparatus (maintain the power of the signal constant). Hereby, this reduces the influence exerted on signals to be transmitted from other transport apparatuses even if the signal to be transmitted from the given transport apparatus changes upon automatic pre-emphasis control.

In the first exemplary embodiment of the present invention, the light multiplex/demultiplex unit 71 further includes a combination unit 710, a generation unit 711, a measurement unit 712, and a feedback unit 713, as illustrated in FIG. 4. The light multiplex/demultiplex unit 71 uses these means to compensate the intensity (power) of a signal to be transmitted, using dummy light.

The combination unit 710 multiplexes signals having different wavelengths and received from the plurality of light transmission/reception units 70 into a multiple-wavelength signal.

The generation unit 711 generates dummy light used to control the signal transmission intensity (power). The combination unit 710 multiplexes the generated dummy light with signals from the plurality of light transmission/reception units 70. In the first exemplary embodiment of the present invention, the generation unit 711 generates dummy light to maintain the intensity (power) of a signal to be transmitted from the transport apparatus 7 (that is, light obtained by multiplexing together signals from the plurality of light transmission/reception units 70) constant.

In the first exemplary embodiment of the present invention, each of the plurality of transport apparatuses 7 is assigned with available wavelengths (wavelength ranges) of an optical signal. Further, each of the plurality of transport apparatuses 7 transmits a signal having the assigned wavelengths (wavelength ranges). It should be noted that each of the plurality of light transmission/reception units 70 included in the transport apparatus 7 transmits a signal using some of the wavelengths (wavelength ranges) assigned to this transport apparatus 7. Wavelengths (wavelength ranges) used may be specified in advance for each light transmission/reception unit 70.

In the first exemplary embodiment of the present invention, the generation unit 711 generates dummy light using at least some of wavelengths (wavelength ranges) that are not used by the light transmission/reception unit 70 included in the transport apparatus 7 among the wavelengths (wavelength ranges) assigned to this transport apparatus 7. Wavelengths (wavelength ranges) used by the light transmission/reception unit 70 may be specified in advance, as described above. In this case, since wavelengths (wavelength ranges) that are not used are also specified in advance, the generation unit 711 generates dummy light using at least some of the wavelengths (wavelength ranges) that are not used.

The information of wavelengths (wavelength ranges) used by the light transmission/reception unit 70 is acquired by, for example, the monitor unit 72. In this case, the monitor unit 72 notifies wavelengths (wavelength ranges) used for dummy light, of the generation unit 711. It should be noted that the generation unit 711 may acquire in advance the information of wavelengths (wavelength ranges) used for dummy light.

In the first exemplary embodiment of the present invention, the generation unit 711 may start to generate dummy light in response to, for example, a request from the monitor unit 72. Further, the generation unit 711 may stop generating dummy light in response to, for example, a request to stop compensation that uses dummy light from the monitor unit 72.

The monitor unit 72 requests the generation unit 711 to start to generate dummy light in response to, for example, a request from an opposed transport apparatus 7. It should be noted that the monitor unit 72 may request the generation unit 711 to stop compensation that uses dummy light, upon, for example, recovery from the trouble in the transport channel 3.

The measurement unit 712 measures the intensity (power) of a signal transmitted from the combination unit 710 (that is, a signal transmitted from the transport apparatus 7). The measurement unit 712 notifies the feedback unit 713 of the measured intensity (power) of the signal.

The feedback unit 713 requests the generation unit 711 to change the intensity (power) of dummy light to maintain the intensity (power) of a signal transmitted from the combination unit 710 constant, based on the signal intensity (power) notified by the measurement unit 712. The feedback unit 713, for example, generates a control signal for changing the intensity (power) of dummy light and transmits it to the generation unit 711. The generation unit 711 changes the intensity (power) of dummy light, based on the control signal. It should be noted that the feedback unit 710 may, for example, start its operation in response to a notification from the monitor unit 72 that trouble has occurred and stop its operation in response to a notification from the monitor unit 72 that recovery from the trouble is made.

Figure 9:
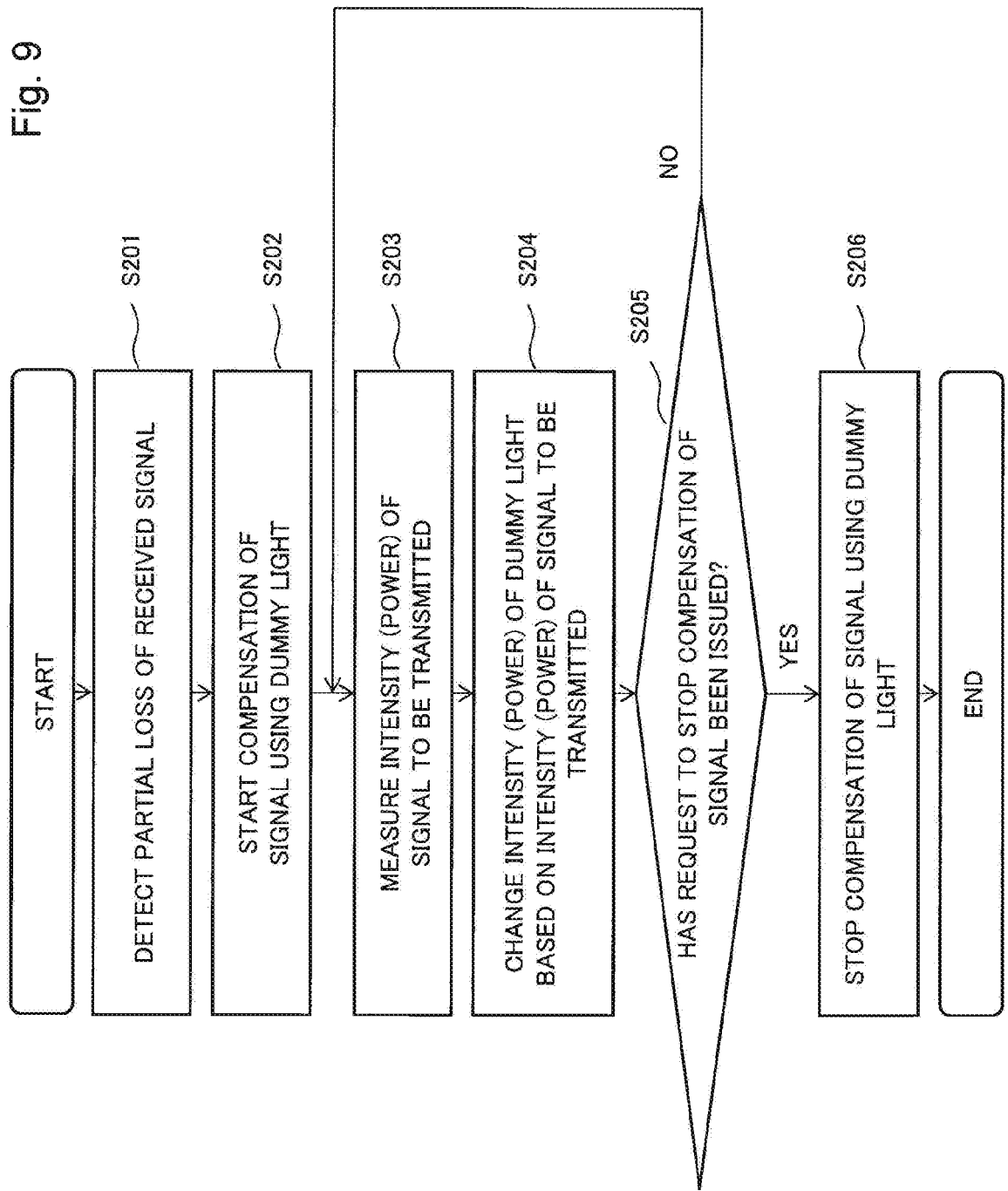
FIG. 9 is a flowchart illustrating an exemplary operation of a light multiplex/demultiplex unit according to the first exemplary embodiment of the present invention.

FIG. 9 is a flowchart illustrating an exemplary operation of the light multiplex/demultiplex unit 71 of the transport apparatus 7.

The trouble detection unit 715 of the light multiplex/demultiplex unit 71 detects that an externally received signal is partially lost (S201). The trouble detection unit 715 then notifies the monitor unit 72 that a loss of signal has occurred.

The generation unit 711 and/or the feedback unit 713 starts to compensate the signal using dummy light in response to a notification from the monitor unit 72 that trouble has occurred in the transport channel 3 (S202).

The measurement unit 712 measures the intensity (power) of a signal to be transmitted outside by the combination unit 710 (S203) and notifies the feedback unit 713 of the measured intensity (power) of the signal.

In response to the notification from the monitor unit 72, the feedback unit 713 issues a request to change the intensity (power) of dummy light to maintain the intensity (power) of a signal to be transmitted from the combination unit 710 constant, based on the signal intensity (power) notified by the measurement unit 712. The generation unit 711 changes the intensity (power) of dummy light in response to the request from the feedback unit 713 (S204).

Upon receiving a request to stop compensation that uses dummy light from the monitor unit 72 (YES in S205), the generation unit 711 stops the compensation (S206). Meanwhile, if the generation unit 711 receives no such request (NO in S205), the generation unit 711 returns the process to step 203 (S203), in which it continues to compensate the signal using dummy light.

As described above, the transport apparatus 7 according to the first exemplary embodiment of the present invention can adjust dummy light in response to a change in intensity (power) of a signal to be transmitted from each of the plurality of light transmission/reception units 70 to maintain the intensity (power) of a signal to be transmitted from this transport apparatus 7 constant.

The transport apparatus according to the first exemplary embodiment of the present invention uses dummy light to compensate for a change in intensity (power) of a signal to be transmitted from a given transport apparatus (transmitting station) to suppress the change in intensity (power) of the signal to be transmitted from the given transport apparatus (maintain the power of the signal constant). This hereby reduces the influence exerted on signals to be transmitted from other transport apparatuses even if the signal to be transmitted from the given transport apparatus changes upon automatic pre-emphasis control.

Second Exemplary Embodiment

A second exemplary embodiment of the present invention will be described below with reference to the accompanying drawings.

In the second exemplary embodiment of the present invention, a plurality of transport apparatuses 7 adjust the times to execute compensation of signals using dummy light beams so that the times for these apparatuses to execute automatic pre-emphasis control and the compensation do not overlap each other. More specifically, the transport apparatus 7 delays the start of automatic pre-emphasis control and compensation of a signal using dummy light in this apparatus while other transport apparatuses 7 perform automatic pre-emphasis control and compensation of signals using dummy light beams.

When trouble occurs in a transport channel 3, each of the plurality of transport apparatuses 7 performs automatic pre-emphasis control for predetermined wavelength components that are lost due to the trouble and compensates them using dummy light to maintain the total power (intensity) of a signal transmitted from this transport apparatus 7 constant.

However, not all transport apparatuses 7 included in a trunk station 1 execute automatic pre-emphasis control and compensation of signals using dummy light beams. For example, some transport apparatuses 7 may execute only automatic pre-emphasis control, that is, only change the intensity of a signal to be transmitted, upon the occurrence of trouble in the transport channel 3 and do not maintain the intensity of a signal to be transmitted constant using dummy light.

In such a case, even if one transport apparatus 7 maintains the intensity of a signal to be transmitted constant using dummy light, the intensity of the signal to be transmitted which is output with its intensity maintained constant changes under the influence of changes in intensity of signals to be transmitted from other transport apparatuses 7.

When this happens, an opposed transport apparatus 7 cannot determine whether the intensity of a signal to be transmitted from the transport apparatus 7 (an apparatus that transmits a signal with its intensity maintained constant using dummy light) has changed because of (1) the influence of changes in intensity of signals to be transmitted from some transport apparatuses 7 or (2) a loss of signal in the transport channel 3.

Thus, in the second exemplary embodiment of the present invention, one apparatus delays the start of compensation of a signal using dummy light while other apparatuses execute automatic pre-emphasis control. Then, when other transport apparatuses 7 do not change the intensities of signals to be transmitted, one transport apparatus 7 executes automatic pre-emphasis control and compensation of a signal using dummy light. With such an operation, when the intensity of a signal to be transmitted from the transport apparatus 7 (an apparatus that transmits a signal with its intensity maintained constant using dummy light) has changed, an opposed transport apparatus 7 can determine that this change results from (2) a loss of signal in the transport channel 3. Therefore, the opposed transport apparatus 7 can request the transport apparatus 7 to execute automatic pre-emphasis control (or continue automatic pre-emphasis control).

It should be noted that in the second exemplary embodiment of the present invention, the same configurations as in the first exemplary embodiment of the present invention will not be described hereinafter.

An exemplary configuration of a transport system according to the second exemplary embodiment of the present invention is the same as in the first exemplary embodiment of the present invention.

In the second exemplary embodiment of the present invention, a light multiplex/demultiplex unit 71 mounted in the transport apparatus 7 delays compensation of a signal using dummy light by a predetermined time when the light multiplex/demultiplex unit 71 receives a notification from a monitor unit 72 that trouble has occurred in the transport channel 3.

When, for example, a transport apparatus 7-1 detects that trouble has occurred in the transport channel 3, it delays compensation of a signal using dummy light by a predetermined first time. It should be noted that the first time is determined in consideration of, for example, the time taken for other transport apparatuses 7 to complete automatic pre-emphasis control. When the transport apparatus 7 can determine the state of automatic pre-emphasis control of other apparatuses, the first time may be determined to delay compensation of a signal using dummy light after such other transport apparatuses 7 complete automatic pre-emphasis control.

Further, when a transport apparatus 7-2 detects that trouble has occurred in the transport channel 3, it delays compensation of a signal using dummy light by a predetermined second time. The second time is determined in consideration of, for example, the time taken for the transport apparatus 7-1 to complete automatic pre-emphasis control. The second time may be determined to, for example, enable the transport apparatus 7-2 to start compensation of a signal using dummy light after the transport apparatus 7-1 completes automatic pre-emphasis control.

Hereby, as described above, in the second exemplary embodiment of the present invention, each of the plurality of transport apparatuses 7 delays the start of automatic pre-emphasis control and compensation of a signal using dummy light so that the times for these apparatuses to execute them do not overlap each other.

Figure 10:
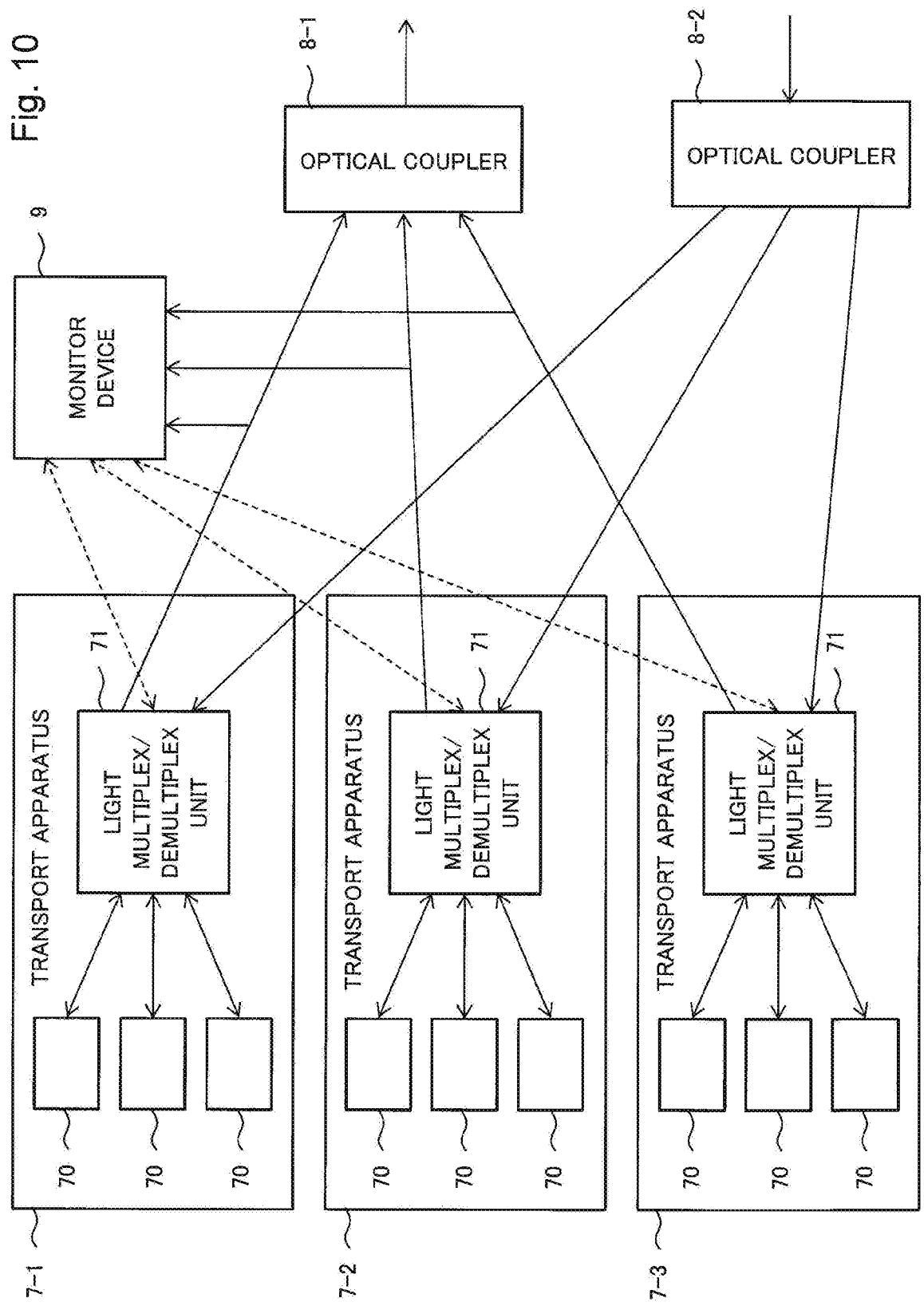
FIG. 10 is a block diagram illustrating an exemplary configuration of a transport system according to a second exemplary embodiment of the present invention.

FIG. 10 is a block diagram illustrating an exemplary configuration of a transport system when a monitor device 9 controls adjustment of the time to execute compensation that uses dummy light beams, and shows another exemplary configuration of the transport system according to the second exemplary embodiment of the present invention. In the other exemplary configuration of the transport system according to the second exemplary embodiment of the present invention, this transport system includes the monitor device 9, as depicted in FIG. 10.

The monitor device 9, for example, monitors a signal transmitted from the light multiplex/demultiplex unit 71 of each of the plurality of transport apparatuses 7 to detect whether this transport apparatus 7 is performing automatic pre-emphasis control. The monitor device 9 includes, for example, a spectrum analyzer which monitors the spectrum of a signal transmitted from the transport apparatus 7. In this case, the monitor device 9 detects whether at least one of the plurality of transport apparatuses is executing automatic pre-emphasis control, based on the spectrum of the signal transmitted from the corresponding light multiplex/demultiplex unit 71.

Further, the monitor device 9 notifies each of the plurality of transport apparatuses 7 of permission to start automatic pre-emphasis control and compensation of a signal using dummy light. When, for example, the monitor device 9 permits the light multiplex/demultiplex unit 71 of the transport apparatus 7-1 to perform automatic pre-emphasis control and compensation of a signal using dummy light, the monitor device 9 does not permit other transport apparatuses 7 to start automatic pre-emphasis control and compensation of a signal using dummy light, until compensation by this light multiplex/demultiplex unit 71 is completed.

The monitor device 9, for example, detects that automatic pre-emphasis control and compensation of a signal using dummy light are completed in the transport apparatus 7-1, and permits another transport apparatus 7-2 to start automatic pre-emphasis control and compensation of a signal using dummy light.

In this manner, according to the second exemplary embodiment of the present invention, each of the plurality of transport apparatuses 7 does not start automatic pre-emphasis control and compensation of a signal using dummy light, unless the monitor device 9 gives permission. Then, while any of the plurality of transport apparatuses 7 performs automatic pre-emphasis control, the monitor device 9 does not permit other transport apparatuses 7 to perform automatic pre-emphasis control and compensation of signals using dummy light beams.

As described above, according to the second exemplary embodiment of the present invention, one apparatus delays the start of compensation of a signal using dummy light while other apparatuses execute automatic pre-emphasis control. Then, when other transport apparatuses 7 do not change the intensities of signals to be transmitted, one transport apparatus 7 executes automatic pre-emphasis control and compensation of a signal using dummy light. Hereby, with such an operation, when the intensity of a signal to be transmitted from the transport apparatus 7 (an apparatus that transmits a signal with its intensity maintained constant using dummy light) has changed, an opposed transport apparatus 7 can determine that this change results from a loss of signal in the transport channel 3. Therefore, the opposed transport apparatus 7 can request the transport apparatus 7 to execute automatic pre-emphasis control (or continue automatic pre-emphasis control).

Third Exemplary Embodiment

A third exemplary embodiment of the present invention will be described below with reference to the accompanying drawings.

The third exemplary embodiment of the present invention combines the methods (means) described in the above-mentioned first and second exemplary embodiments of the present invention to provide a function of ensuring a given communication quality by compensating the intensity (power) of a signal surviving after trouble occurs in a transport channel 3. Therefore, according to the third exemplary embodiment of the present invention, each of a plurality of transport apparatuses (transmitting stations) can further improve the effectiveness of compensation of a signal using dummy light. It should be noted that in the third exemplary embodiment of the present invention, the function of ensuring a given communication quality by compensating the intensity (power) of a signal surviving after trouble occurs in the transport channel 3 will be referred to as OADM Fault Recovery hereinafter.

In the third exemplary embodiment of the present invention, the same configurations as in the first and second exemplary embodiments of the present invention will not be described hereinafter.

Figure 11:
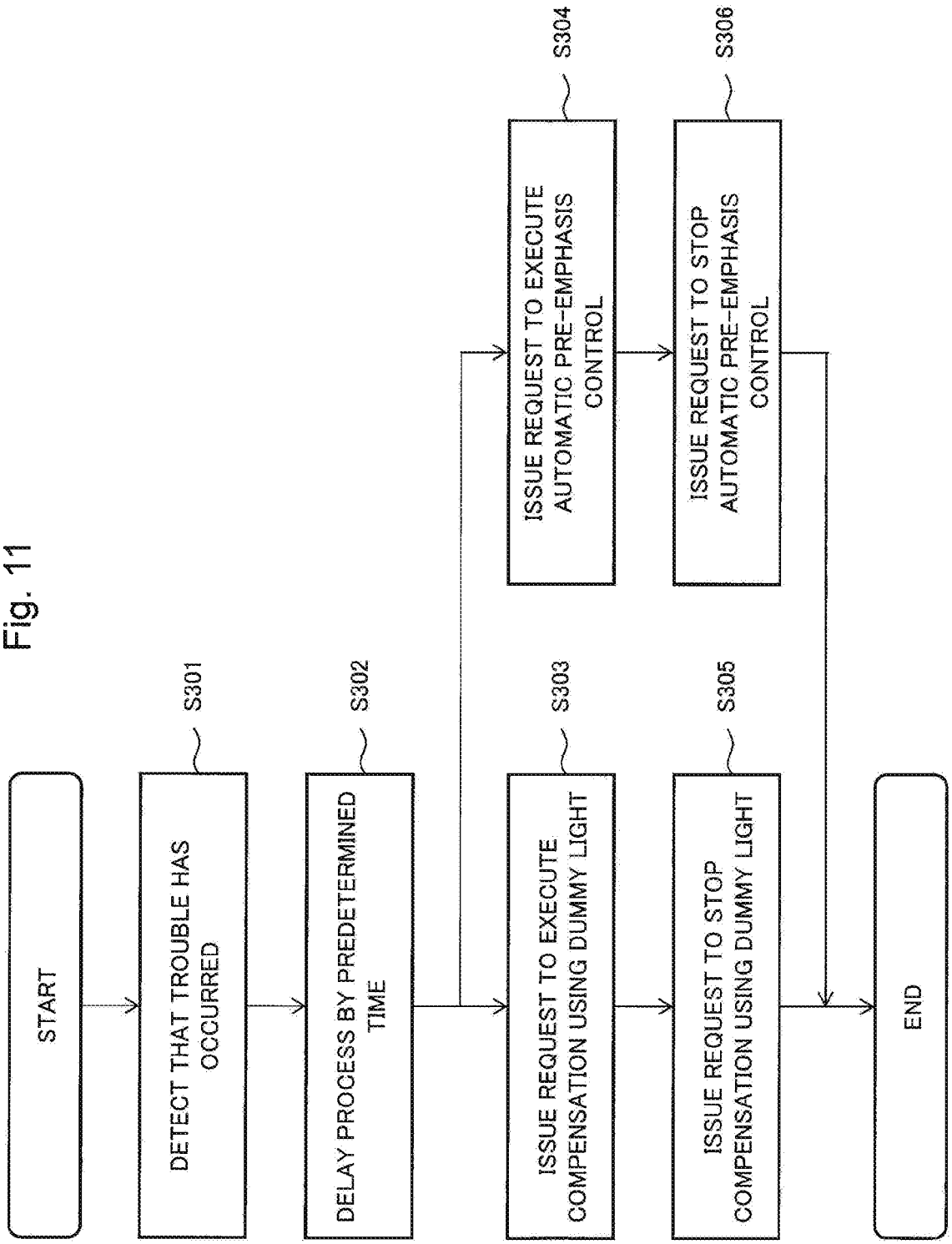
FIG. 11 is a flowchart illustrating an exemplary operation of a transport apparatus according to a third exemplary embodiment of the present invention.

FIG. 11 is a flowchart illustrating an exemplary operation of a transport apparatus according to the third exemplary embodiment of the present invention when OADM Fault Recovery is executed.

As illustrated in FIG. 11, a transport apparatus 7 detects that trouble has occurred in the transport channel 3 (S301).

Upon detecting that trouble has occurred, the transport apparatus 7 delays a process for coping with the trouble, by a predetermined time (S302). The predetermined time may be the time determined in advance or taken for other transport apparatuses 7 to complete the process.

The transport apparatus 7 requests an opposed transport apparatus 7 to compensate the signal using dummy light, upon the elapse of the predetermined time (S303). The transport apparatus 7 further requests the opposed transport apparatus 7 to execute automatic pre-emphasis control (control of the power of a signal to be transmitted, based on the reception quality), upon the elapse of a predetermined time (S304).

When, for example, the reception quality of a received signal is recovered, the transport apparatus 7 requests the opposed transport apparatus 7 to stop (end) compensation of a signal using dummy light (S305). Further, when, for example, the reception quality of a received signal is recovered, the transport apparatus 7 requests the opposed transport apparatus 7 to stop (end) automatic pre-emphasis control (S306). Upon receiving the requests, the opposed transport apparatus 7 maintains the states of automatic pre-emphasis control and compensation of signals using dummy signals having been executed until that moment.

It should be noted that in the third exemplary embodiment of the present invention, the opposed transport apparatus 7 may execute a process for restoring the output setting of dummy light and the output setting of a signal to be transmitted to the state before the occurrence of trouble is detected, when recovery from the trouble in the transport channel is performed because of, for example, the completion of cable repair. This process is called restoration, which includes (1) a method for operating, for example, a monitor device 9 shown in FIG. 10 to restore the setting of a light multiplex/demultiplex unit 71 of the transport apparatus 7 or the like to the state before the occurrence of trouble is detected, and (2) a method for automatically restoring this setting by recovery of LOW (alarm recovery).

Each light transmission/reception unit 70 functions as a transponder (TPND), which converts a signal received from, for example, a client apparatus (not illustrated) into a signal suitable for long-range light transmission and sends it. Further, each light transmission/reception unit 70 also functions as a TPND, which branches a signal to be sent to a client apparatus based on a received signal and passes the resultant signal to the client apparatus.

In step 301 (S301) of FIG. 11, the light multiplex/demultiplex unit 71 of the transport apparatus 7 detects that trouble has occurred in the transport channel 3. As described above, the trouble detection unit 715 of the transport apparatus 7 notifies the monitor unit 72 of a LOW (Loss of Wavelength) alarm upon detection of the occurrence of the trouble.

The monitor unit 72 can specify the light transmission/reception unit 70 targeted for automatic pre-emphasis control (in the opposed transport apparatus 7), in accordance with the type of notified LOW. Upon receiving LOW(2) indicating the loss of an Add signal block of station C from the trouble detection unit 715, the monitor unit 72 of the trunk station 1-1 (station A) determines, as a target for automatic pre-emphasis control, the light transmission/reception unit 70 that outputs a signal from the opposed trunk station 1-2 (station B) to the apparatus of its own (trunk station 1-1 (station A)).

In other words, when the monitor unit 72 of the trunk station 1-1 (station A) receives LOW(2), a signal transmitted from the trunk station 1-2 (station B) to the trunk station 1-1 (station A) may be excessively amplified due to the loss of a signal transmitted from the branch station 2 (station C). Therefore, the trunk station 1-1 (station A) can determine that it is necessary to control the power of a signal to be transmitted from the light transmission/reception unit 70 that transmits a signal to the apparatus of its own (trunk station 1-1 (station A)), at the trunk station 1-2 (station B).

When the light transmission/reception unit 70 targeted for automatic pre-emphasis control (in the opposed transport apparatus 7) is specified, the transport apparatus 7 requests the specified light transmission/reception unit 70 to execute automatic pre-emphasis control via, for example, communication channels 6 (outbound communication channels).

FIG. 12 is a table representing the correspondence between a combination of LOW alarms received by the monitor unit 72 of the trunk station 1-1 (station A) and a landing station that requires automatic pre-emphasis control (that is, the trunk station 1 and the branch station 2). When, for example, the monitor unit 72 of the trunk station 1-1 (station A) receives LOW(2), it can be determined that automatic pre-emphasis control is necessary for the light transmission/reception unit 70 that transmits a signal to the branch station 2 (station C), at the trunk station 1-2 (station B).

FIG. 13 is a table representing the correspondence between a combination of LOW alarms received by the monitor unit 72 of the trunk station 1-2 (station B) and a landing station that requires automatic pre-emphasis control (that is, the trunk station 1 and the branch station 2), like FIG. 12.

FIG. 14 is a table representing the correspondence between a combination of LOW alarms received by the monitor unit 72 of the branch station 2 (station C) and a landing station that requires automatic pre-emphasis control (that is, the trunk station 1 and the branch station 2), like FIGS. 12 and 13.

Figure 15:
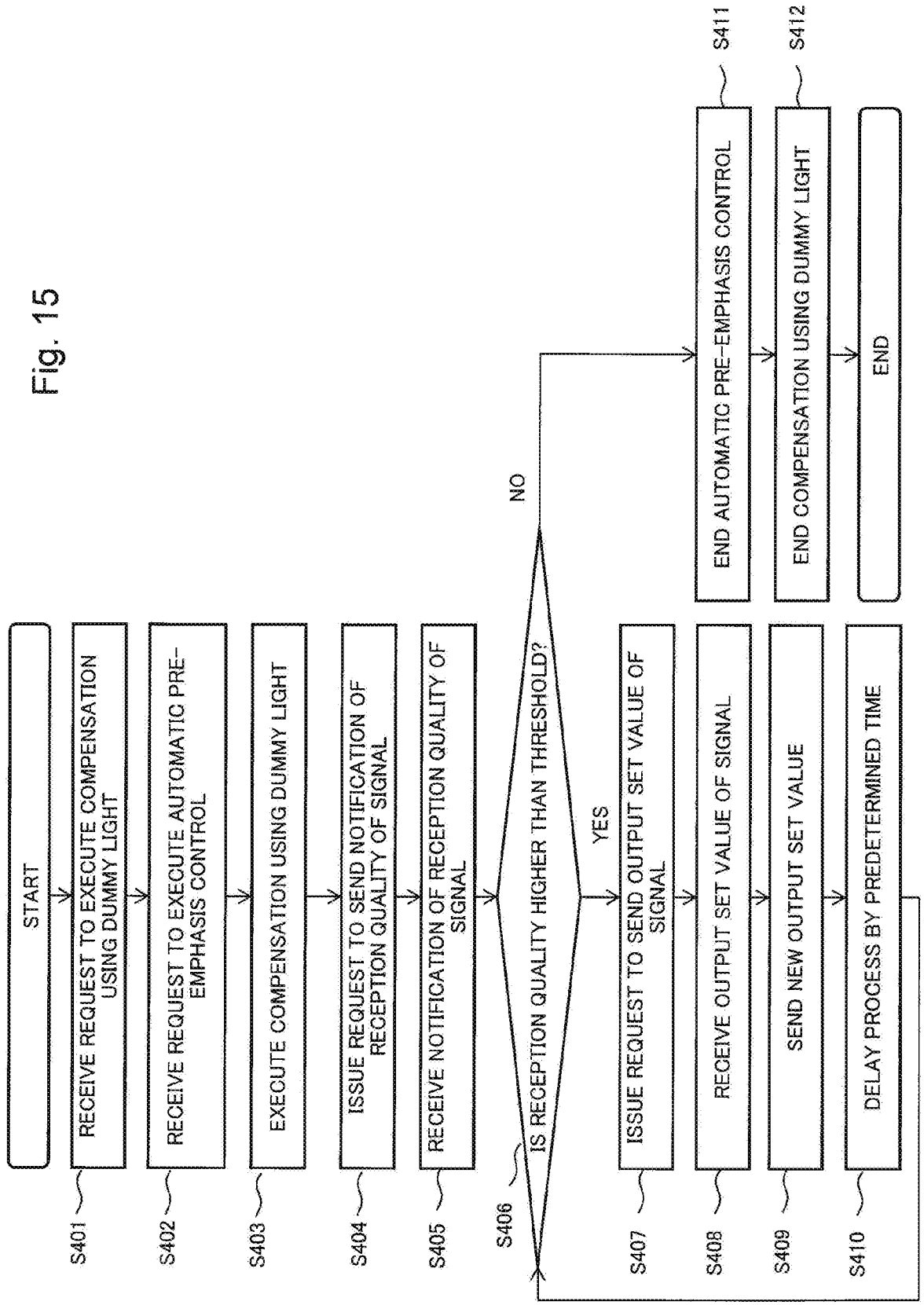
FIG. 15 is a flowchart illustrating another exemplary operation of the transport apparatus according to the third exemplary embodiment of the present invention.

FIG. 15 is a flowchart illustrating another exemplary operation of the transport apparatus according to the third exemplary embodiment of the present invention when OADM Fault Recovery is executed. More specifically, FIG. 15 illustrates an exemplary operation of the transport apparatus 7 in response to a request to execute compensation of a signal using dummy light and automatic pre-emphasis control, from the opposed transport apparatus 7.

As illustrated in FIG. 15, the transport apparatus 7 receives a request to compensate the signal using dummy light from the opposed transport apparatus 7 (S401). The transport apparatus 7 further receives a request to execute automatic pre-emphasis control (control of the power of a signal to be transmitted, based on the reception quality) from the opposed transport apparatus 7 (S402). It should be noted that the transport apparatus 7 may receive only a request to execute automatic pre-emphasis control. In this case, the transport apparatus 7 compensates the signal using dummy light in response to the request to execute automatic pre-emphasis control.

The transport apparatus 7 compensates the signal using dummy light (S403). More specifically, the monitor unit 72 of the transport apparatus 7, for example, sends a command to start constant output control to the light multiplex/demultiplex unit 71. The light multiplex/demultiplex unit 71 compensates the signal using dummy light in response to the command received. The transport apparatus 7, for example, changes the intensity (power) of dummy light to maintain the intensity (power) of a signal to be transmitted constant.

The transport apparatus 7 requests each of the plurality of light transmission/reception units 70 to send the notification of the reception quality of a signal in the opposed transport apparatus 7 (receiving side) (S404). More specifically, the monitor unit 72 of the transport apparatus 7 transmits, to each of the plurality of light transmission/reception units 70, an opposed error count read command for requesting them to send the reception quality notification.

The transport apparatus 7 receives the notification of the reception quality of a signal from the opposed transport apparatus 7 (S405). More specifically, the transport apparatus 7 receives an opposed error count from the opposed transport apparatus 7 as the value of the reception quality.

The transport apparatus 7 compares the notified value of the reception quality with a predetermined threshold (S406).

If it is determined as a result of comparison that the notified reception quality is higher than the predetermined threshold (that is, the opposed error count defined as the value of the reception quality is larger than a threshold), the monitor unit 72 of the transport apparatus 7 determines, as a target for automatic pre-emphasis control, the light transmission/reception unit 70 having sent this reception quality and sends an output set value read command to the determined light transmission/reception unit 70 (S407). The output set value read command is used to read the set value of the intensity (power) of a signal to be transmitted.

Upon receiving the output set read command, the light transmission/reception unit 70 notifies the monitor unit 72 of the output set value that is the set value of the signal transmission intensity (power) (S408).

The monitor unit 72 notifies each light transmission/reception unit 70 of an output change command for lowering the notified output set value by a predetermined amount to obtain a new output set value (S409).

The monitor unit 72 returns the process to step 406 (S406) after the elapse of a predetermined time (for example, 1 sec) (S410).

If it is determined as a result of comparison in step 406 (S406) that all notified reception qualities are lower than the predetermined threshold (that is, the opposed error count defined as the value of the reception quality is smaller than the threshold), the transport apparatus 7 ends automatic pre-emphasis control (S411).

Upon the end of automatic pre-emphasis control, the transport apparatus 7 ends compensation of the intensity (power) of a signal using dummy light (S412). More specifically, the monitor unit 72 of the transport apparatus 7 sends a command to stop constant output control to the light multiplex/demultiplex unit 71 upon the end of automatic pre-emphasis control. The light multiplex/demultiplex unit 71 ends compensation of the intensity (power) of a signal using dummy light and notifies the monitor unit 72 to that effect.

Figure 16:
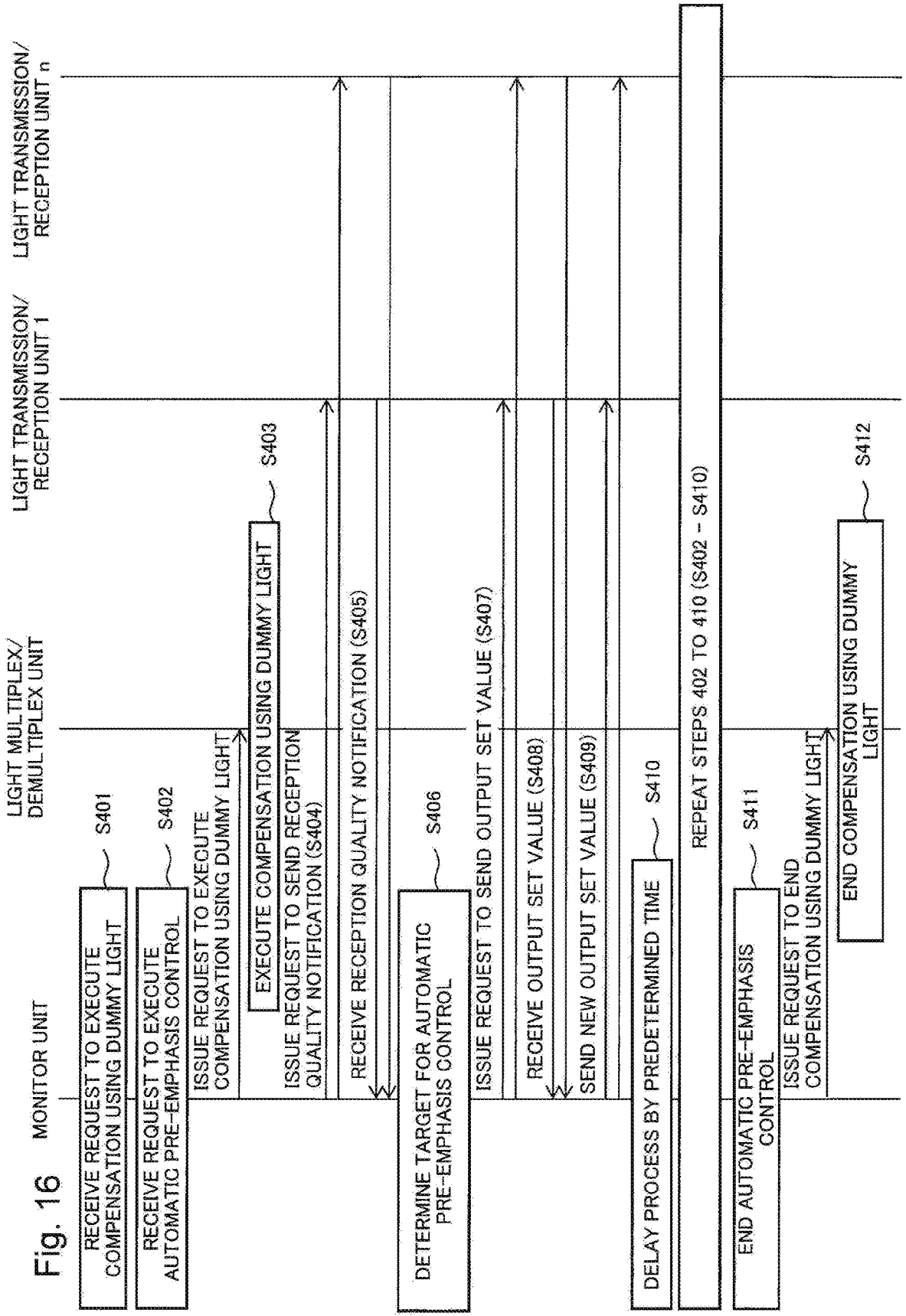
FIG. 16 is a sequence chart illustrating an exemplary operation of the transport apparatus according to the third exemplary embodiment of the present invention.

FIG. 16 is a sequence chart illustrating another exemplary operation of the transport apparatus according to the third exemplary embodiment of the present invention when OADM Fault Recovery shown in FIG. 15 is executed. It should be noted that the process in each step illustrated in FIG. 16 is the same as the process in each step illustrated in FIG. 15.

As described above, the third exemplary embodiment of the present invention combines the methods (means) described in the above-mentioned first and second exemplary embodiments of the present invention to provide a function of ensuring a given communication quality by compensating the intensity (power) of a signal surviving after trouble occurs in the transport channel 3. Therefore, according to the third exemplary embodiment of the present invention, each of a plurality of transport apparatuses (transmitting stations) can further improve the effectiveness of compensation of a signal using dummy light.

Fourth Exemplary Embodiment

A fourth exemplary embodiment of the present invention will be described below with reference to the accompanying drawings. In the fourth exemplary embodiment of the present invention, the computer, CPU (Central Processing Unit), MPU (Micro-Processing Unit), or the like of a transport apparatus 7 executes software (programs) for implementing the functions of the above-mentioned respective exemplary embodiments.

In the fourth exemplary embodiment of the present invention, the transport apparatus 7 obtains software (programs) for implementing the functions of the above-mentioned respective exemplary embodiments via a network or various storage media such as a CD-R (Compact Disc Recordable). Programs obtained by the transport apparatus 7 or storage media storing the programs constitute the present invention. It should be noted that the software (programs) may be stored in advance in, for example, a predetermined storage unit included in the transport apparatus 7.

The computer, CPU, MPU, or the like of the transport apparatus 7 reads and executes the program codes of the obtained software (programs). Thus, the transport apparatus 7 executes the same process as that of the transport apparatus 7 in each of the above-mentioned exemplary embodiments.

According to the fourth exemplary embodiment of the present invention, the present invention is applicable to programs to be implemented in the computer, CPU, MPU, or the like of the transport apparatus 7.

Fifth Exemplary Embodiment

A fifth exemplary embodiment of the present invention will be described below with reference to the accompanying drawings.

Figure 17:
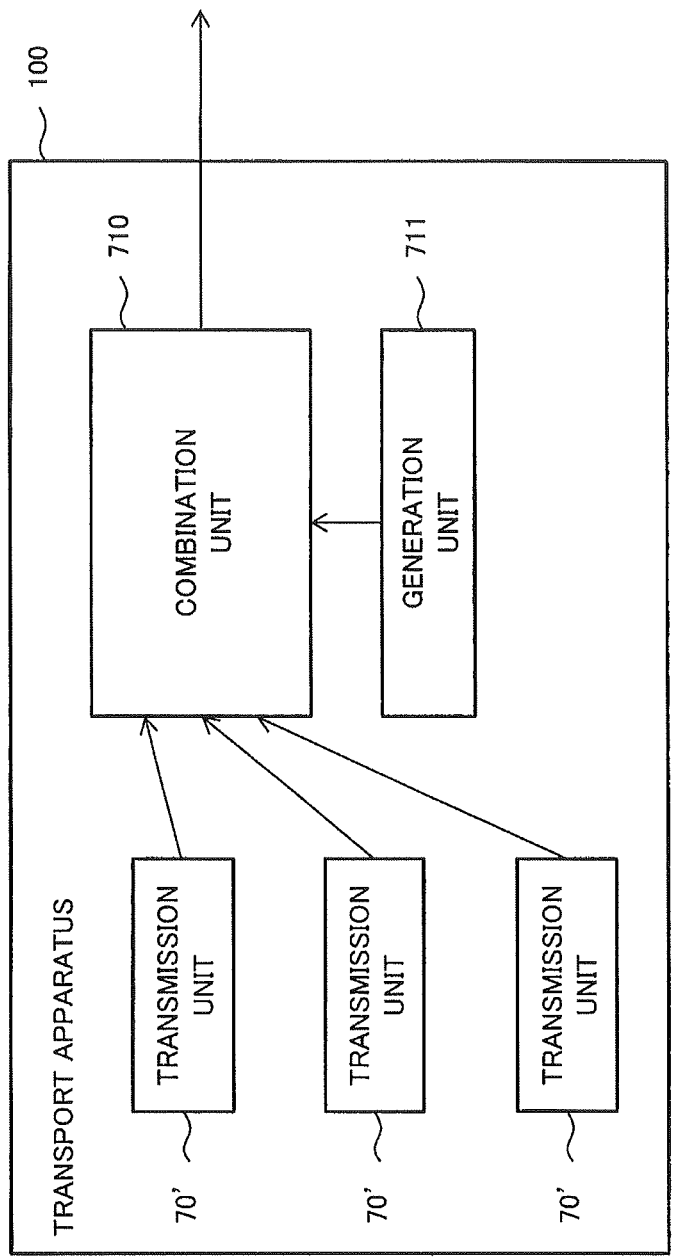
FIG. 17 is a view illustrating an exemplary configuration of a transport apparatus according to a fifth exemplary embodiment of the present invention.

A transport apparatus 100 according to the fifth exemplary embodiment of the present invention includes a transmission unit 70' corresponding to the light transmission/reception unit 70 in each of the above-mentioned exemplary embodiments, as illustrated in FIG. 17. Further, the transport apparatus 100 includes a generation unit 711 which generates dummy light, and a combination unit 710 which combines signals with each other.

The transmission unit 70' transmits a first signal. The generation unit 711 generates a dummy signal for compensating the first signal transmitted from the transmission unit 70'. The combination unit 710 combines the first signal with the dummy signal.

In the fifth exemplary embodiment of the present invention, the generation unit 711 adjusts the intensity of the dummy signal to be generated, to maintain the intensity of a second signal obtained by combining the first signal with the dummy signal constant.

As described above, the transport apparatus according to the fifth exemplary embodiment of the present invention maintains the intensity (power) of a signal (that is, a second signal) compensated using a dummy signal constant. Thus, the transport apparatus according to the fifth exemplary embodiment of the present invention can reduce the influence that the compensated signal (second signal) exerts on signals from other transport apparatuses.

Although optical signals have been taken as an example in the above-mentioned exemplary embodiments, the present invention is not limited to optical signals and is also applicable to, for example, electrical signals.

The whole or part of the exemplary embodiments disclosed above can be described as, but not limited to, the following supplementary notes.

[Supplementary Note 1]

A transport apparatus comprising:

transmission means for transmitting a first signal;

generation means for generating a dummy signal for compensating the first signal transmitted from the transmission means; and combination means for combining the first signal with the dummy signal, wherein the generation means adjusts an intensity of the dummy signal to be generated, to maintain an intensity of a second signal obtained by combining the first signal with the dummy signal constant.

[Supplementary Note 2]

The transport apparatus according to supplementary note 1, further comprising:

measurement means for measuring an intensity of the second signal, wherein the generation means determines an intensity of the dummy signal to be generated, to maintain the intensity of the second signal measured by the measurement means constant.

[Supplementary Note 3]

The transport apparatus according to supplementary note 1 or 2, wherein the generation means starts to generate the dummy signal when trouble occurs in a transport channel configured to transport the second signal.

[Supplementary Note 4]
The transport apparatus according to supplementary note 3, wherein the generation means starts to generate the dummy signal a predetermined time after occurrence of trouble in the transport channel.

[Supplementary Note 5]
The transport apparatus according to supplementary note 1 or 2, further comprising:
monitor means for sending a request to generate a dummy signal to the generation means,
wherein the generation means starts to generate the dummy signal in response to the request from the monitor means.

[Supplementary Note 6]
The transport apparatus according to supplementary note 5, wherein the monitor means requests the generation means to start to generate the dummy signal upon occurrence of trouble in the transport channel.

[Supplementary Note 7]
The transport apparatus according to any one of supplementary notes 1 to 6, wherein the transmission means adjusts an intensity of the first signal based on a reception quality of the first signal in an opposed apparatus which receives the first signal.

[Supplementary Note 8]
The transport apparatus according to supplementary note 7, wherein the monitor means requests the transmission means to adjust an intensity of the first signal when a reception quality of the first signal is higher than a predetermined threshold.

[Supplementary Note 9]
The transport apparatus according to supplementary note 7 or 8, wherein
the transmission means comprises a plurality of transmission means, and
the monitor means requests transmission means, having transmitted a first signal with a reception quality higher than the predetermined threshold of first signals transmitted from the plurality of transmission means, to adjust an intensity of the first signal.

[Supplementary Note 10]
The transport apparatus according to any one of supplementary notes 7 to 9, wherein the monitor means continues to request the transmission means to adjust an intensity of the first signal until reception qualities of all first signals respectively transmitted from the plurality of transmission means become lower than the predetermined threshold.

[Supplementary Note 11]
The transport apparatus according to any one of supplementary notes 7 to 10, further comprising:
trouble detection means for detecting that trouble has occurred in the transport channel, based on an intensity of a received signal,
wherein the monitor means requests the transmission means to adjust an intensity of the first signal when the monitor means is notified by the trouble detection means that trouble has occurred in the transport channel.

[Supplementary Note 12]
A transport system comprising:
a plurality of transport apparatuses each comprising:
transmission means for transmitting a first signal;
generation means for generating a dummy signal for compensating the first signal transmitted from the transmission means; and
combination means for combining the first signal with the dummy signal,
wherein the generation means adjusts an intensity of the dummy signal to be generated, to maintain an intensity of a second signal obtained by combining the first signal with the dummy signal constant.

[Supplementary Note 13]
The transport system according to supplementary note 12, wherein
each of the plurality of transport apparatuses comprises measurement means for measuring an intensity of the second signal, and
the generation means determines an intensity of the dummy signal to be generated, to maintain the intensity of the second signal measured by the measurement means constant.

[Supplementary Note 14]
The transport system according to supplementary note 12 or 13, further comprising:
a transport channel configured to transport a signal obtained by combining the second signals transmitted from the plurality of transport apparatuses,
wherein the generation means starts to generate the dummy signal when trouble occurs in the transport channel.

[Supplementary Note 15]
The transport system according to supplementary note 14, wherein the generation means starts to generate the dummy signal a predetermined time after occurrence of trouble in the transport channel.

[Supplementary Note 16]
The transport system according to supplementary note 12 or 13, wherein
each of the plurality of transport apparatuses comprises monitor means for sending a request to generate a dummy signal to the generation means, and
the generation means starts to generate the dummy signal in response to the request from the monitor means.

[Supplementary Note 17]
The transport system according to supplementary note 16, wherein the monitor means requests the generation means to start to generate the dummy signal upon occurrence of trouble in the transport channel.

[Supplementary Note 18]
The transport system according to supplementary note 16 or 17, further comprising:
a control device which controls generation of dummy signals in the plurality of transport apparatuses,
wherein the monitor means requests the generation means to start to generate the dummy signal in response to the request from the control device.

[Supplementary Note 19]
The transport system according to any one of supplementary notes 16 to 18, wherein the control device requests a second transport apparatus to start to generate the dummy signal, upon end of generation of the dummy signal in a first transport apparatus, of the plurality of transport apparatuses.

[Supplementary Note 20]
The transport system according to any one of supplementary notes 12 to 19, further comprising:
an opposed apparatus which receives the first signal,
wherein the transmission means adjusts an intensity of the first signal based on a reception quality of the first signal in the opposed apparatus.

[Supplementary Note 21]
The transport system according to supplementary note 20, wherein the monitor means requests the transmission means to adjust an intensity of the first signal when the reception quality of the first signal is higher than a predetermined threshold.

[Supplementary Note 22]

The transport system according to supplementary note 20 or 21, wherein the monitor means sends a request to notify the monitor means of the reception quality of the first signal to the transmission means, and the transmission means obtains the reception quality of the first signal from the opposed apparatus in response to the request from the monitor means.

[Supplementary Note 23]

The transport system according to any one of supplementary notes 20 to 22, wherein each of the plurality of transport apparatuses comprises the transmission means comprising a plurality of transmission means, and the monitor means requests transmission means, having transmitted a first signal with a reception quality higher than the predetermined threshold of first signals transmitted from the plurality of transmission means, to adjust an intensity of the first signal.

[Supplementary Note 24]

The transport system according to any one of supplementary notes 20 to 23, wherein the monitor means continues to request the transmission means to adjust an intensity of the first signal until reception qualities of all first signals respectively transmitted from the plurality of transmission means become lower than the predetermined threshold.

[Supplementary Note 25]

The transport system according to any one of supplementary notes 20 to 24, further comprising:

trouble detection means for detecting that trouble has occurred in the transport channel, based on an intensity of a received signal, wherein the monitor means requests the transmission means to adjust an intensity of the first signal when the monitor means is notified by the trouble detection means that trouble has occurred in the transport channel.

[Supplementary Note 26]

A transport method comprising:

transmitting a first signal;

generating a dummy signal for compensating the first signal;

combining the first signal with the dummy signal; and adjusting an intensity of the dummy signal to be generated, to maintain an intensity of a second signal obtained by combining the first signal with the dummy signal constant.

[Supplementary Note 27]

The transport method according to supplementary note 26, further comprising:

measuring an intensity of the second signal, determining an intensity of the dummy signal to be generated, to maintain the intensity of the second signal measured by the measurement means constant.

[Supplementary Note 28]

The transport method according to supplementary note 26 or 27, wherein generating the dummy signal when trouble occurs in a transport channel configured to transport the second signal.

[Supplementary Note 29]

The transport method according to supplementary note 28, wherein the generating the dummy signal is started when a predetermined time after occurrence of trouble in the transport channel.

[Supplementary Note 30]

The transport method according to supplementary note 26 or 27, wherein the generating the dummy signal is started in response to a request to generate the dummy signal.

[Supplementary Note 31]

The transport method according to supplementary note 30, further comprising:

requesting to start to generate the dummy signal upon occurrence of trouble in the transport channel.

[Supplementary Note 32]

The transport method according to any one of supplementary notes 26 to 31, further comprising:

adjusting an intensity of the first signal based on a reception quality of the first signal in an opposed apparatus which receives the first signal.

[Supplementary Note 33]

The transport method according to supplementary note 32, wherein the adjusting is requested for intensity of the first signal when a reception quality of the first signal is higher than a predetermined threshold.

[Supplementary Note 34]

The transport method according to supplementary note 32 or 33, wherein when the first signal comprises a plurality of first signals and the plurality of first signals are transmitted, the adjusting is requested for intensity of a first signal, having a reception quality higher than a predetermined threshold, of the plurality of first signals.

[Supplementary Note 35]

The transport method according to any one of supplementary notes 32 to 34, wherein the adjusting is requested continuously until reception qualities of all of the plurality of first signals become lower than the predetermined threshold.

[Supplementary Note 36]

The transport method according to any one of supplementary notes 32 to 35, further comprising:

detecting that trouble has occurred in the transport channel, based on an intensity of a received signal, wherein the adjusting is requested for intensity of the first signal when the monitor means is notified by the trouble detection means that trouble has occurred in the transport channel.

[Supplementary Note 37]

A program causing a computer to execute the processes of:

transmitting a first signal;

generating a dummy signal for compensating the first signal;

combining the first signal with the dummy signal; and adjusting an intensity of the dummy signal to be generated, to maintain an intensity of a second signal obtained by combining the first signal with the dummy signal constant.

[Supplementary Note 38]

The program according to supplementary note 37, further comprising the processes of generating the dummy signal when trouble occurs in a transport channel configured to transport the second signal.

[Supplementary Note 39]

The transport method according to supplementary note 37 or 38, further comprising the processes of generating the dummy signal when trouble occurs in a transport channel configured to transport the second signal.

[Supplementary Note 40]

The program according to supplementary note 39, further comprising the processes of generating the dummy signal is started when a predetermined time after occurrence of trouble in the transport channel.

[Supplementary Note 41]

The program according to supplementary note 37 or 38, wherein the generating the dummy signal is started in response to a request to generate the dummy signal.

[Supplementary Note 42]

The program according to supplementary note 41, further comprising the processes of requesting to start to generate the dummy signal upon occurrence of trouble in the transport channel.

[Supplementary Note 43]

The program according to any one of supplementary notes 37 to 42, further comprising the processes of adjusting an intensity of the first signal based on a reception quality of the first signal in an opposed apparatus which receives the first signal.

[Supplementary Note 44]

The program according to supplementary note 43, wherein the processes of adjusting is requested for intensity of the first signal when a reception quality of the first signal is higher than a predetermined threshold.

[Supplementary Note 45]

The program according to supplementary note 43 or 44, further comprising the process of, when the first signal comprises a plurality of first signals and the plurality of first signals are transmitted, requesting to adjust for intensity of a first signal, having a reception quality higher than a predetermined threshold, of the plurality of first signals.

[Supplementary Note 46]

The program according to any one of supplementary notes 43 to 45, further comprising the process of requesting to adjust continuously until reception qualities of all of the plurality of first signals become lower than the predetermined threshold.

[Supplementary Note 47]

The program according to any one of supplementary notes 43 to 46, further comprising the process of detecting that trouble has occurred in the transport channel, based on an intensity of a received signal, wherein the adjusting is requested for intensity of the first signal when the monitor means is notified by the trouble detection means that trouble has occurred in the transport channel.

This application is based upon and claims the benefit of priority from Japanese patent application No. 2013-196483, filed on Sep. 24, 2013, the disclosure of which is incorporated herein in its entirety by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1, 1-1: trunk station
2: branch station
3: transport channel
4: optical repeater
5: branching device (OADM-BU)
6: communication channel
7, 7-1, 7-2, 7-3, 100: transport apparatus
8, 8-1, 802: optical coupler
9: monitor device
50: optical Add/Drop unit
70: light transmission/reception unit
70': transmission unit
71: light multiplex/demultiplex unit
72: monitor unit
710: combination unit
711: generation unit
712: measurement unit
713: feedback unit
714: light demultiplex unit
715: trouble detection unit

The invention claimed is:

1. A transport system comprising:
a first transport apparatus comprising:
a transmitter for transmitting a first optical signal whose intensity is adjusted based on a reception quality;
a generation circuit for generating a dummy signal whose intensity is adjusted based on the adjusted intensity of the first optical signal; and
a combination circuit for combining the first optical signal with the dummy signal, and outputting a first multiplexed signal;
a second transport apparatus for transmitting a second multiplexed signal, wherein the second transport apparatus comprises a transmitter transmitting a second optical signal;
a multiplexer for multiplex the first multiplexed signal and the second multiplexed signal; and
a monitor apparatus for monitoring the first multiplexed signal and the second multiplexed signal on a same side of a transport channel as the first transport apparatus and the second transport apparatus,
wherein the transmitter and the generation circuit of the first transport apparatus start to adjust the first optical signal and the dummy signal based on an information of the second transport apparatus which is monitored by the monitor apparatus when the second transport apparatus is not adjusting the second optical signal and a second dummy signal.

2. The transport system according claim 1, wherein the intensity of the first optical signal is reduced until the reception quality in an opposed apparatus is lower than a predetermined threshold.

3. The transport system according claim 1, wherein the transmitter and the generation circuit of the first transport apparatus start to adjust the first optical signal and the dummy signal when the second transport apparatus do not change intensities of signals to be transmitted.

4. The transport system according claim 1, wherein the second transport apparatus comprising:
the transmitter for transmitting the second optical signal whose intensity is adjusted based on a reception quality;
a generation circuit for generating the second dummy signal whose intensity is adjusted based on the adjusted intensity of the second optical signal; and
a combination circuit for multiplex the second optical signals and the second dummy signal, and outputting the second multiplexed signal,
wherein the transmitter and the generation circuit of the second transport apparatus start to adjust each signal based on an information of the first transport apparatus which is monitored by the monitor apparatus.

5. The transport system according claim 1, the monitor apparatus comprising a spectrum analyzer for analyzing the first multiplexed signal and the second multiplexed signal.

6. The transport system according claim 1, wherein the monitor apparatus detects whether the first transport apparatus and the second transport apparatus is executing an automatic pre-emphasis control.

7. A transport method comprising:
a first transport apparatus transmits a first optical signal, generates a dummy signal for compensating the first optical signal and combines the first optical signal with the dummy signal as a first multiplexed signal, a second transport apparatus transmits a second multiplexed signal comprising a second optical signal, a multiplexer multiplexes the first multiplexed signal and the second multiplexed signal, a monitor apparatus monitors the first multiplexed signal and the second multiplexed signal on a same side of a transport channel as the first transport apparatus and the second transport apparatus, and the first transport apparatus starts to adjust the first optical signal and the dummy signal based on an information of the second transport apparatus which is monitored by the monitor apparatus when the second transport apparatus is not adjusting the second optical signal and a second dummy signal.

8. The transport method according claim 7, wherein the intensity of the first optical signal is reduced until a reception quality in an opposed apparatus is lower than a predetermined threshold.

9. The transport method according claim 7, wherein the first transport apparatus starts to adjust the first optical signal and the dummy signal when the second transport apparatus don't change intensities of signals to be transmitted.

10. The transport method according claim 7, the monitor apparatus analyzes the first multiplexed signal and the second multiplexed signal by a spectrum analyzer.

11. The transport method according claim 7, wherein the monitor apparatus detects whether the first transport apparatus and the second transport apparatus is executing an automatic pre-emphasis control.

* * * * *